United States Patent
Krosschell et al.

(10) Patent No.: US 9,586,765 B2
(45) Date of Patent: Mar. 7, 2017

(54) CONVEYOR BELT CLEANER WITH REMOVABLE CLEANER ASSEMBLY

(71) Applicant: Flexible Steel Lacing Company, Downers Grove, IL (US)

(72) Inventors: Marcus L. Krosschell, Wyoming, MI (US); Brett E. DeVries, Comstock Park, MI (US); Richard W. Gilman, Kentwood, MI (US)

(73) Assignee: Flexible Steel Lacing Company, Downers Grove, IL (US)

( * ) Notice: Subject to any disclaimer, the term of this patent is extended or adjusted under 35 U.S.C. 154(b) by 0 days.

(21) Appl. No.: 14/738,426

(22) Filed: Jun. 12, 2015

(65) Prior Publication Data

US 2015/0360880 A1 Dec. 17, 2015

Related U.S. Application Data

(60) Provisional application No. 62/011,542, filed on Jun. 12, 2014.

(51) Int. Cl.
*B65G 45/16* (2006.01)

(52) U.S. Cl.
CPC ......... *B65G 45/16* (2013.01); *Y10T 29/49828* (2015.01)

(58) Field of Classification Search
CPC ......... B65G 45/12; B65G 45/14; B65G 45/16
(Continued)

(56) References Cited

U.S. PATENT DOCUMENTS

| 756,962 A | 4/1904 | Hooper |
|---|---|---|
| 936,887 A | 7/1909 | Healey |

(Continued)

FOREIGN PATENT DOCUMENTS

| CA | 1221050 | 4/1987 |
|---|---|---|
| CN | 2714492 Y | 8/2005 |

(Continued)

OTHER PUBLICATIONS

Asgco, Toro Reversing Secondary Belt Cleaner Part Number Guide, copyright date Jun. 2012, 2 pages.
(Continued)

*Primary Examiner* — William R Harp
(74) *Attorney, Agent, or Firm* — Fitch, Even, Tabin & Flannery LLP

(57) ABSTRACT

A conveyor belt cleaner is provided having a removable cleaner assembly that may be easily connected and disconnected from an elongate support member. The cleaner assembly includes one or more scraper blades mounted to an angle bar, an interface between the blades and the angle bar, and an interface between the blades and the support member. The blades have bodies that cover or surround the interfaces and reduce the likelihood of debris entering the interfaces and binding the blades to the angle bar and/or the support member. The cleaner further includes a securing mechanism with a pair of clamps for clamping the angle bar against seats of the elongate support. The clamps cause the angle bar to hold a base portion of the blades against the support member which permits the blade base portions to transmit loading from the conveyor belt directly to the support member.

37 Claims, 28 Drawing Sheets

(58) Field of Classification Search
USPC .................................................. 198/497–499
See application file for complete search history.

(56) References Cited

U.S. PATENT DOCUMENTS

| | | |
|---|---|---|
| 3,342,312 A | 9/1967 | Reiter |
| 3,674,131 A | 7/1972 | Matson |
| 3,767,210 A | 10/1973 | Havens et al. |
| 3,841,470 A | 10/1974 | Meguro |
| 3,952,863 A | 4/1976 | Schattauer |
| 3,994,384 A | 11/1976 | Reiter |
| 4,031,252 A | 6/1977 | Sullivan et al. |
| 4,036,354 A | 7/1977 | Reiter |
| 4,053,045 A | 10/1977 | Reiter |
| 4,182,444 A | 1/1980 | Fisher |
| 4,189,046 A | 2/1980 | Ward et al. |
| 4,359,150 A | 11/1982 | Bowman et al. |
| 4,529,084 A | 7/1985 | Zhang |
| 4,533,035 A | 8/1985 | Reiter |
| 4,533,036 A | 8/1985 | Gordon |
| 4,541,523 A | 9/1985 | Stockton |
| 4,633,999 A | 1/1987 | Perneczky |
| 4,639,967 A | 2/1987 | Bordignon |
| 4,641,852 A | 2/1987 | Kerst et al. |
| 4,658,949 A | 4/1987 | Reicks |
| 4,694,952 A | 9/1987 | Meijer |
| 4,696,389 A | 9/1987 | Schwarze |
| 4,768,644 A | 9/1988 | Cromm |
| 4,779,716 A | 10/1988 | Gordon |
| 4,792,154 A | 12/1988 | Kerst et al. |
| 4,825,996 A | 5/1989 | Davidts |
| 4,838,409 A | 6/1989 | Rappen |
| 4,850,474 A | 7/1989 | Schwarze |
| 4,854,443 A | 8/1989 | Gordon |
| 4,887,329 A | 12/1989 | Perneczky |
| 4,917,231 A | 4/1990 | Swinderman |
| 4,953,689 A | 9/1990 | Peterson et al. |
| 4,962,845 A | 10/1990 | Gibbs |
| 5,011,002 A | 4/1991 | Gibbs |
| 5,014,844 A | 5/1991 | Anttonen |
| 5,016,746 A | 5/1991 | Gibbs |
| 5,031,750 A | 7/1991 | Barnes |
| 5,082,106 A | 1/1992 | Schwarze |
| 5,088,965 A | 2/1992 | Swinderman et al. |
| 5,114,000 A | 5/1992 | Rappen |
| 5,197,587 A | 3/1993 | Malmberg |
| 5,222,588 A | 6/1993 | Gordon |
| 5,222,589 A | 6/1993 | Gordon |
| 5,301,797 A | 4/1994 | Hollyfield, Jr. et al. |
| D347,918 S | 6/1994 | Gibbs |
| 5,413,208 A | 5/1995 | Veenhof |
| 5,518,107 A | 5/1996 | Schwarze |
| 5,573,102 A | 11/1996 | Puchalla |
| 5,692,595 A | 12/1997 | Gilbert |
| 5,797,477 A | 8/1998 | Veenhof |
| 5,826,700 A | 10/1998 | Brink |
| 5,944,167 A | 8/1999 | Brink |
| 5,950,803 A | 9/1999 | Schwarze |
| 5,979,638 A | 11/1999 | Wiggins |
| 6,041,913 A | 3/2000 | Dolan |
| 6,056,112 A | 5/2000 | Wiggins |
| 6,076,656 A | 6/2000 | Mat |
| 6,082,524 A | 7/2000 | Brink |
| 6,152,290 A | 11/2000 | Mott et al. |
| 6,179,114 B1 | 1/2001 | Brink |
| 6,279,727 B1 | 8/2001 | Waalkes et al. |
| 6,283,274 B1 | 9/2001 | Dolan et al. |
| 6,296,105 B1 | 10/2001 | Carnes |
| 6,315,105 B1 | 11/2001 | Gibbs |
| 6,321,901 B1 | 11/2001 | Strebel et al. |
| 6,349,816 B1 | 2/2002 | Tenzer |
| 6,374,990 B1 | 4/2002 | Swinderman |
| 6,454,080 B1 | 9/2002 | Brink |
| 6,457,575 B2 | 10/2002 | Swinderman |
| 6,581,754 B2 | 6/2003 | Law |
| 6,591,969 B2 | 7/2003 | Swinderman |
| D482,508 S | 11/2003 | DeVries |
| 6,681,919 B1 | 1/2004 | Brink |
| 6,749,725 B1 | 6/2004 | Isometsa et al. |
| 6,823,983 B2 | 11/2004 | DeVries |
| 6,874,616 B2 | 4/2005 | DeVries et al. |
| 6,926,133 B2 | 8/2005 | Kolodziej |
| D524,009 S | 6/2006 | Smith |
| 7,093,706 B2 | 8/2006 | DeVries et al. |
| D543,670 S | 5/2007 | Swinderman |
| 7,308,980 B2 | 12/2007 | Peterson |
| 7,347,315 B2 | 3/2008 | Kolodziel |
| 7,367,443 B2 | 5/2008 | Swinderman |
| 7,370,750 B2* | 5/2008 | Swinderman .......... B65G 45/16 198/494 |
| 7,424,945 B2 | 9/2008 | Swinderman |
| D594,623 S | 6/2009 | Felton |
| 7,565,962 B2* | 7/2009 | Thew .................... B65G 45/12 198/497 |
| D632,045 S | 2/2011 | Kotze |
| 8,123,022 B2 | 2/2012 | Mott |
| D657,525 S | 4/2012 | Kirschner |
| 8,245,836 B2 | 8/2012 | Kotze |
| D669,243 S | 10/2012 | Kirschner |
| 8,393,459 B2 | 3/2013 | Childs |
| 8,464,858 B2 | 6/2013 | Kirschner |
| 8,640,856 B2 | 2/2014 | DeVries |
| D702,013 S | 4/2014 | Childs |
| D702,014 S | 4/2014 | Childs |
| 8,757,360 B2 | 6/2014 | Kuiper |
| D710,564 S | 8/2014 | Yang |
| 8,875,870 B2 | 11/2014 | Waters |
| D739,635 S | 9/2015 | Peterson |
| D740,514 S | 10/2015 | Peterson et al. |
| D747,838 S | 1/2016 | Krosschell |
| D748,885 S | 2/2016 | Peterson |
| 2003/0066738 A1 | 4/2003 | Veenhof |
| 2003/0230466 A1 | 12/2003 | Swinderman et al. |
| 2004/0188224 A1 | 9/2004 | Kolodziej et al. |
| 2006/0131135 A1 | 6/2006 | Waters |
| 2007/0089968 A1 | 4/2007 | Swinderman |
| 2010/0126832 A1 | 5/2010 | DeVries |
| 2011/0220461 A1 | 9/2011 | Kirschner |
| 2012/0247922 A1 | 10/2012 | Waters |

FOREIGN PATENT DOCUMENTS

| | | |
|---|---|---|
| DE | 3402407 A1 | 7/1985 |
| EP | 0254977 A1 | 2/1988 |
| FR | 2590243 A1 | 11/1985 |
| GB | 2290276 A | 12/1995 |
| GB | 2448378 A | 10/2008 |
| WO | 0078650 A1 | 12/2000 |
| WO | 2011034553 | 3/2011 |

OTHER PUBLICATIONS

Flexco, Mineline MSS Standard-Duty Secondary Belt Cleaner Part Number Guide, copyright date 2008, 2 pages.
Martin, Reversing Mount Tensioners Operator's Manual, Martin Engineering 1996, 1998, Aug. 1999, 30 pages.
Martin, New Belt Cleaner Design Reduces Cost of Ownership News Release, Martin Engineering, Feb. 16, 2015, 2 pages.
Martin, QB1 Cleaner HD Opertor's Manual M4022, Martin Engineering Company 2015, 20 pages.
ConShear Retrofit Replacement Blades for OEM Belt Cleaners Part Number Cross-Reference Guide, copyright date 2008, 11 pages.
Flexco, Belt Conveyor Products, copyright date 2013, 28 pages.
Invitation to Pay Additional Search Fees and, Where Applicable, Protest Fee from the International Bureau of WIPO for International Application No. PCT/US15/35633 dated Sep. 8, 2015, 3 pages.
Notification of Transmittal of the International Search Report and the Written Opinion of the International Searching Authority, or the Declaration from the International Bureau of WIPO for correspond-

(56) References Cited

OTHER PUBLICATIONS ing International Application No. PCT/US15/35633, dated Nov. 24, 2015, 12 pages.

* cited by examiner

CONVEYOR BELT CLEANER WITH REMOVABLE CLEANER ASSEMBLY

CROSS-REFERENCE TO RELATED APPLICATION

This application claims the benefit of U.S. Provisional Patent Application No. 62/011,542, filed Jun. 12, 2014, which is hereby incorporated by reference in its entirety.

FIELD

The invention relates to a cleaner for a conveyor belt and, more particularly, to a conveyor belt cleaner having a cleaner assembly that may be easily serviced or replaced.

BACKGROUND

A variety of industries utilize conveyor belts to transport goods and materials from one place to another. Generally, material is deposited onto an upstream end of an upper carry run of a conveyor belt and is discharged at a downstream end of the carry run of the conveyor belt. Some material may remain adhered to the belt surface after the bulk of the material has been discharged at the downstream end of the carry run of the belt. The material that remains adhered as the belt travels along the lower or return run may fall below the conveyor belt and create waste. It is known to scrape the belt clean as the belt travels along the return run so that it is free of material adhered thereto.

One type of conveyor belt cleaner includes a cross shaft extending across the conveyor belt that is secured to supports on opposite sides of the conveyor belt. The conveyor belt cleaner includes a cartridge that may be releasably connected to the cross shaft extending across the conveyor belt. In one such configuration, such as described in U.S. Pat. No. 6,581,754 to Law, the cartridge has an upper sleeve that receives scraper blades and a lower sleeve that may be slid onto the cross shaft. To permit installation of the cartridge onto the cross shaft, there is a clearance between the larger, lower sleeve of the cartridge and the smaller, cross shaft. However, material removed from the conveyor belt can collect in the clearance and adhere to both the cartridge and the cross shaft along their lengths thereof and effectively bind the cartridge to the cross shaft so that the cartridge cannot be easily removed.

U.S. Pat. No. 8,245,836 to Kotze discloses a belt cleaner with several belt scrapers each having a rubber blade mount bonded to an inverted u-shaped steel mounting base. The mounting base has an opening leading to a rectangular locating recess in the blade mount formed in an underside of the belt scraper. The belt cleaner of the '836 patent includes an elongate base extending across the conveyor belt with triangular locating formations spaced along the elongate base and extending upwardly therefrom. To connect the belt scrapers to the elongate base, the belt scrapers are mounted over the locating formations on the base so that the locating formations are received in the locating recesses of the belt scrapers. Because each belt scraper is mounted over a respective locating formation, each belt scraper must first be aligned with the locating formation and fit onto the locating formation which may be labor intensive and difficult in confined environments.

Each belt cleaner of the '836 patent also has a small, circular securing passage extending through the blade mount that receives a small, circular securing rod for attaching the belt scrapers to the elongate base. Once the belt scrapers have been mounted on the locating formations of the elongate base, the securing rod is passed through an aperture of a flange mounted to the elongate base, through the securing passage of each blade mount, and through an aperture in each of the locating formations of the elongate base and through an aperture of another flange mounted to the elongate base. It may be difficult in some applications to align the flange apertures, blade mount securing passages, and locating formation apertures before passing the securing rod therethrough. Further, the belt cleaner of the '836 patent also requires accurate tolerances to permit all of the apertures to be aligned. Another shortcoming of the belt cleaner of the '836 patent is that a separate, small circular stiffness adjustment rod is passed through a stiffness adjustment slot of each of the blade mounts to provide stiffness for the blade mounts. The stiffness adjustment rod can extend through the stiffness adjustment slot at different positions to provide different amounts of stiffness for the blade mounts. Thus, two separate small circular rods are used to mount and provide stiffness to the blade mounts which makes installation and maintenance more complicated.

SUMMARY

In accordance with one aspect of the present invention, a scraper blade for scraping material from a conveyor belt running in a downstream travel direction is provided. The scraper blade has an upper scraping portion and a resilient, lower body portion. The scraper blade has a through opening extending through the lower body portion for receiving a complimentary elongate mounting member therethrough. The through opening has a pair of ends spaced from each other in the downstream travel direction and a non-linear cross-sectional configuration in the downstream travel direction extending from one end of the opening to the other end. In one form, the non-linear cross-sectional configuration of the through opening permits an angle bar to be used to secure the scraper blade to a support assembly. Angle bar typically has a high strength against bending and provides a rigid support for the scraper blade which improves the overall strength of the conveyor belt cleaner utilizing the scraper blade. Further, angle bar is often used for maintenance at facilities that utilize conveyors, therefore angle bar is commonly stored on-site or readily available. This permits the scraper blade to be mounted to a support assembly of a conveyor belt cleaner without a specialized mounting rail or rod. The on-site or readily available angle bar may be cut to length using common tools, such a band saw or cut-off saw. The scraper blade having a through opening with a non-linear cross-sectional configuration thereby makes it easier to install the scraper blade using common materials and tools on-site or readily available at many facilities.

The cross-sectional configuration of the through opening may include a pair of lower, generally straight portions extending away from an upper juncture of the generally straight portions. The generally straight portions of the through opening may thereby be positioned closer to a support member supporting the lower body portion of the scraper blade, such as a pole. With the elongate mounting member received in the through opening, the scraper blade permits a compact assembly of the scraper blade lower body portion, elongate mounting member, and support member.

In accordance with another aspect, a scraper blade is provided for being connected to a support assembly extending across a conveyor belt and scraping the conveyor belt as the conveyor belt travels in a downstream belt travel direction. The scraper blade includes an upper scraping portion and a resilient, lower body portion. The lower body portion has leg portions generally extending in upstream and downstream directions and a lower portion connecting the leg portions. The scraper blade also has a through opening with leg opening portions extending through corresponding ones of the leg portions. The through opening extends about the lower portion of the resilient lower body portion and is sized to receive an elongate mounting member for securing the resilient lower body portion to the support assembly. Because the through opening has leg opening portions extending through the leg portions of the lower body portion and the through bore extends about the lower portion of the lower body portion, the elongate member received in the through opening can firmly secure the leg portions and the lower portion of the lower body portion to the support assembly.

The resilient lower body portion may have a plurality of protrusions extending into the through opening for contacting the elongate mounting member received in the through opening. The protrusions may reduce the surface area of the resilient lower body portion that contacts the elongate mounting member. This makes it easier to fit the elongate mounting member through the through opening of the lower body portion and slide the scraper blade along the elongate mounting member into a desired position on the elongate mounting member. Further, the protrusions accommodate variation in the shape of the elongate member along its length by permitting localized shifting or deflection of one or more of the protrusions as needed to accommodate the variation in the elongate mounting member.

A conveyor belt cleaner assembly is provided for being secured to a support of a support assembly that extends across a conveyor belt transversely to a downstream travel direction. The support assembly includes a securing mechanism for clamping the cleaner assembly to the support. The cleaner assembly provided includes an elongate mounting member for being clamped to the support by the securing mechanism and at least one scraper blade for being mounted to the elongate mounting member. The at least one scraper blade has a through opening sized to receive the elongate mounting member extending therethrough for mounting the scraper blade to the elongate mounting member. The resilient lower body portion of the at least one scraper blade has a base portion extending below the through opening so that the base portion of the scraper blade is held between the elongate mounting member and the support with the securing mechanism clamping the elongate mounting member to the support. By holding the base portion of the scraper blade resilient lower body portion between the elongate mounting member and the support, the resilient lower body portion of the scraper blade can be secured against the support and form an interface with the support that resists ingress of particulate between the blade and the support. It has been discovered that conveyed particulate, especially fine particulate produced during some mining operations, may be carried by water into gaps between components of prior conveyor belt cleaners to eventually form a concrete-like bond between the components. The conveyor belt cleaner assembly provided herein and its particulate-resistant interface between the at least one scraper blade and the support is therefore advantageous because the scraper blade is less likely to bond to the support and remains easy to remove from the support even after prolonged use with conveyor belts carrying fine particulate.

In accordance with another aspect, a conveyor belt cleaner system is provided having a support for extending across the conveyor belt and a cleaner assembly for being positioned on the support. The cleaner assembly has an elongate mounting member and at least one scraper blade for being mounted on the elongate mounting member. The at least one scraper blade has a resilient, lower body portion with a through opening for receiving the elongate mounting member extending therethrough to mount the at least one scraper blade to the elongate mounting member. The resilient lower body portion of the at least one scraper blade further includes a bottom surface configured for seating on the support. By seating the bottom surface of the scraper blade resilient lower body portion against the support, the lower body portion of the at least one scraper blade may transfer a portion of the loading from the conveyor belt directly to the support. This is an improvement over some prior conveyor belt cleaners that utilize scraper blades mounted to a custom rail that connects to a support pole, and transmit all of the conveyor belt loading through the rail and then to the support pole which requires a more complex and expensive rail.

The elongate mounting member may have opposite end portions that both extend out from the through opening of the at least scraper blade mounted on the elongate mounting member. The system includes a pair of clamps configured to fix the elongate mounting member end portions to the support. This provides an easy-to-use and rigid mechanism for securing the elongate mounting member and at least one scraper blade thereon to the support.

A method is also provided for connecting a cleaner assembly having an elongate mounting member and at least one scraper blade to a support assembly extending across a conveyor belt. The method includes seating a resilient, lower body portion of the at least one scraper blade of the cleaner assembly on the support assembly. The method further includes securing the elongate mounting member to the support assembly with the resilient, lower body portion of the scraper blade seated on the support assembly.

DETAILED DESCRIPTION

Figure 1:
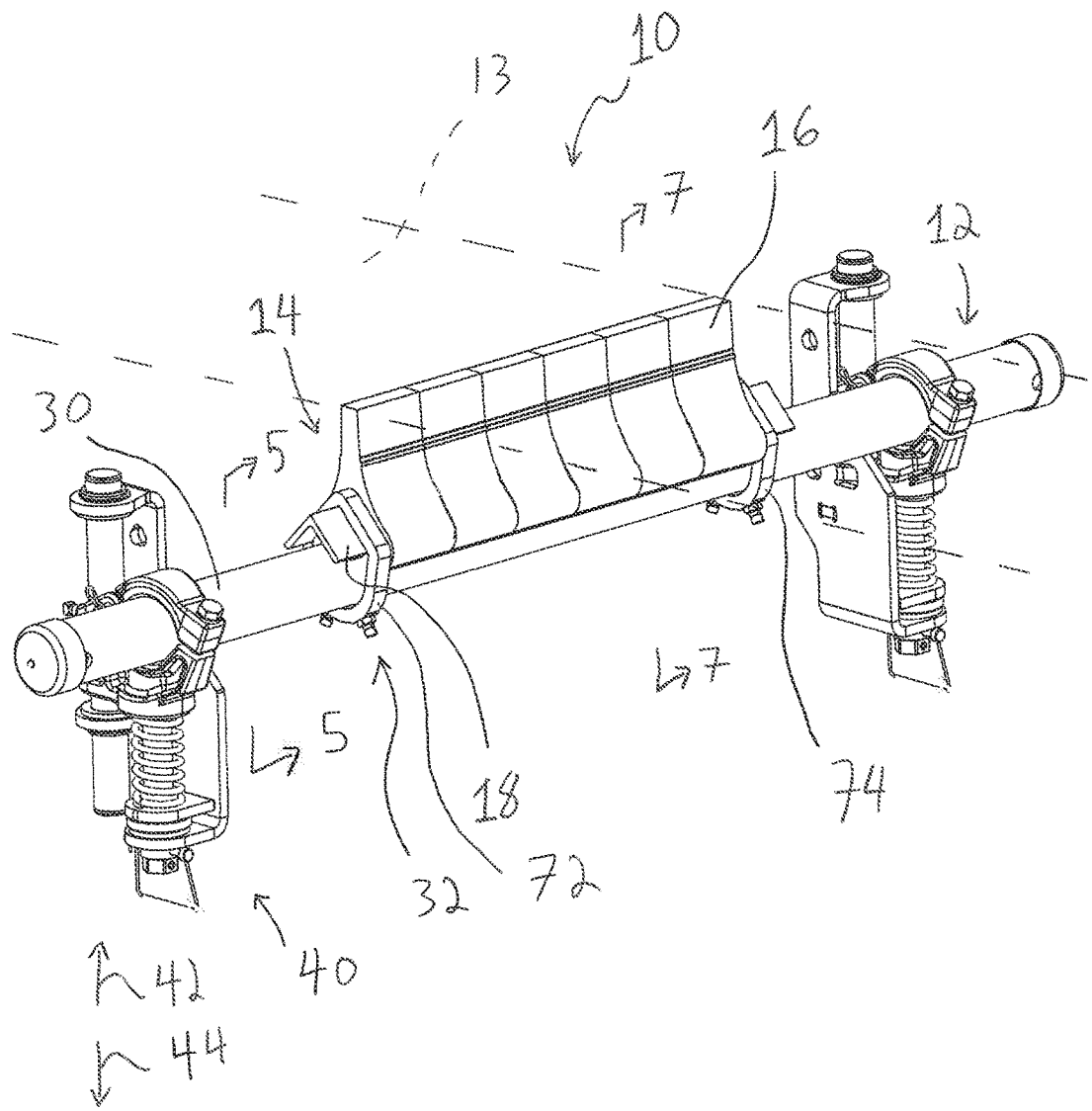
FIG. 1 is a perspective view of a conveyor belt cleaner with a removable cleaner assembly mounted below a return run of a conveyor belt shown in phantom.
Figure 2:
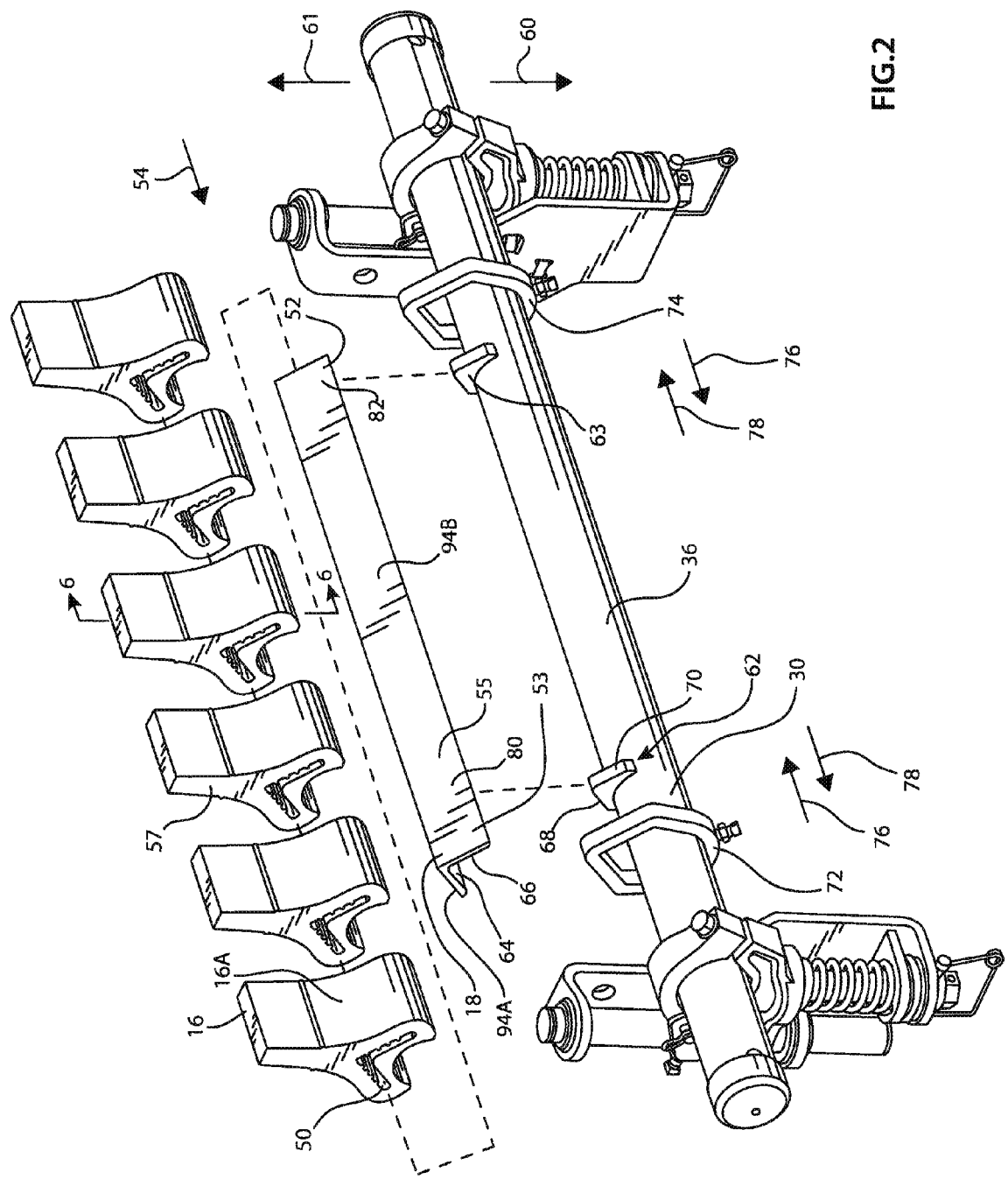
FIG. 2 is an exploded view of the conveyor belt cleaner of FIG. 1 showing scraper blades of the assembly, an angle bar of the assembly, and a support pole to which the assembly is mounted.
Figure 3:
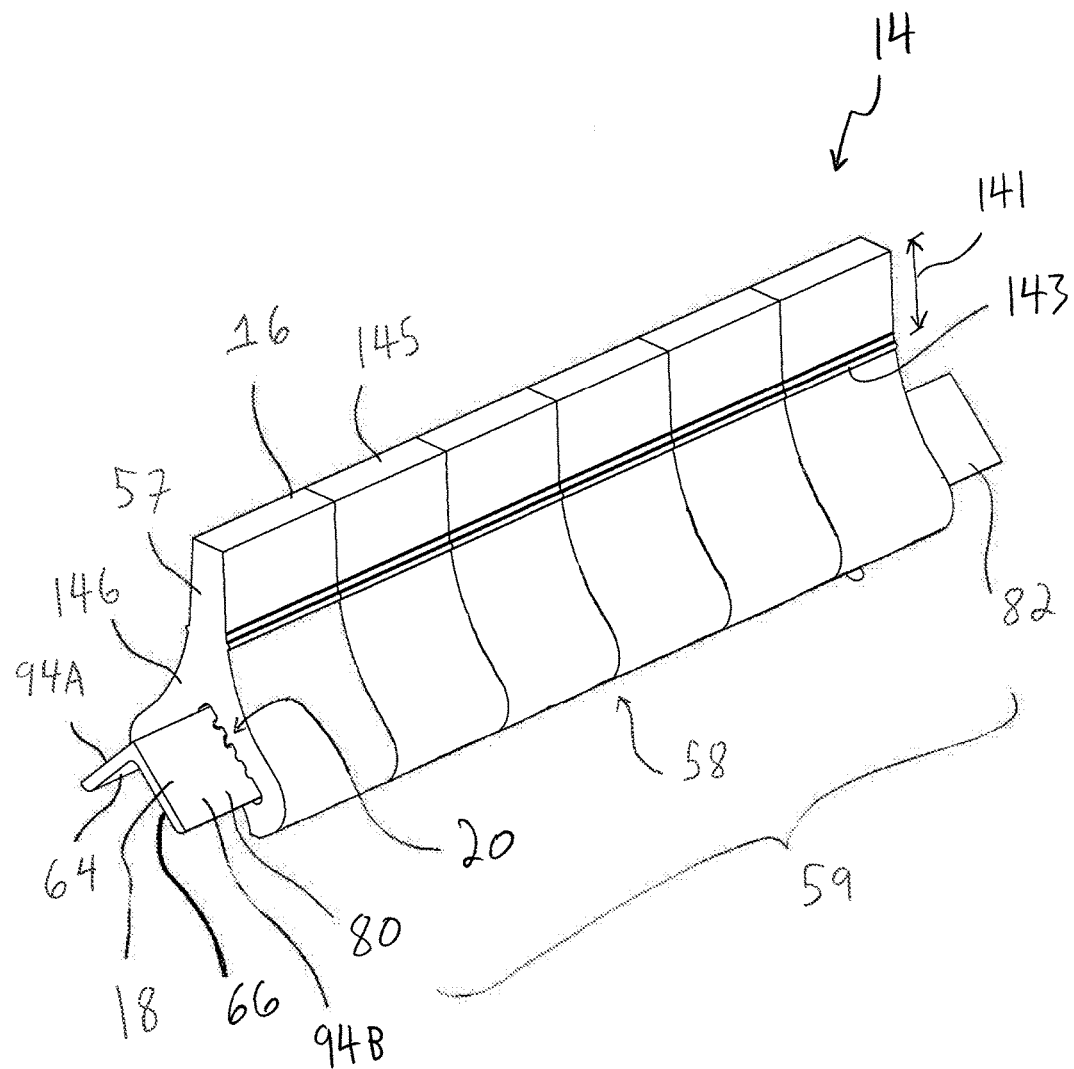
FIG. 3 is a perspective view of the assembled removable cleaner assembly of the conveyor belt cleaner of FIG. 1 including the scraper blades and angle bar shown in FIG. 2.

With reference to FIGS. 1-3, a conveyor belt cleaner 10 is provided having a support assembly 12 for being mounted to extend across a conveyor belt 13 and a removable cleaner assembly 14 that may be easily connected and disconnected from the support assembly 12. The removable cleaner assembly 14 includes one or more scraper blades 16 mounted to an elongate mounting member, such as an angle bar 18, with an interface 20 (see FIG. 3) between the blades 16 and outer surfaces 64, 66, 94A, 94B (see FIG. 7) of the angle bar 18. The blades 16 each have a body 146 surrounding the interface 20 which reduces the likelihood of debris becoming lodged between the blades 16 and the angle bar 18 and binding the blades 16 to the angle bar 18. The blades 16 may thereby be easily removed from the angle bar 18 even after extended periods of use in conveyor applications that generate high levels of particulates and dust, such as mining operations. The removable cleaner assembly 14 improves over prior belt cleaners where fine particles of conveyed materials may be carried by water into gaps between components of the cleaners and form a concrete-like bond between the components. The particulate-resistant cleaner assembly 14 is therefore especially advantageous for use in applications where conveyed materials include fine particulates, such as mining operations.

Figure 6:
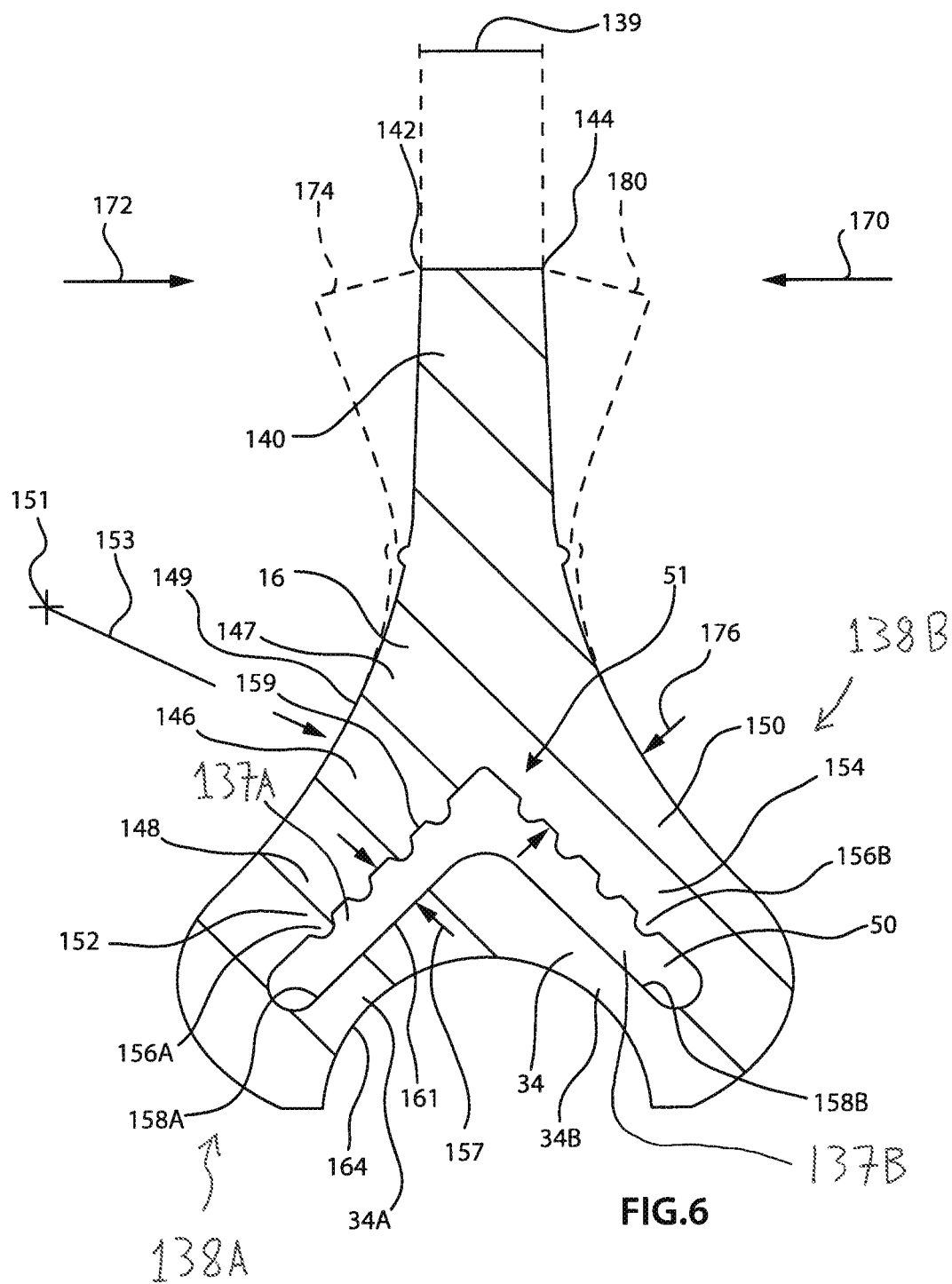
FIG. 6 is a cross-sectional view of one of the scraper blades taken across line 6-6 in FIG. 2 with dashed lines showing deflection of an upper scraping portion of the blade.
Figure 7:
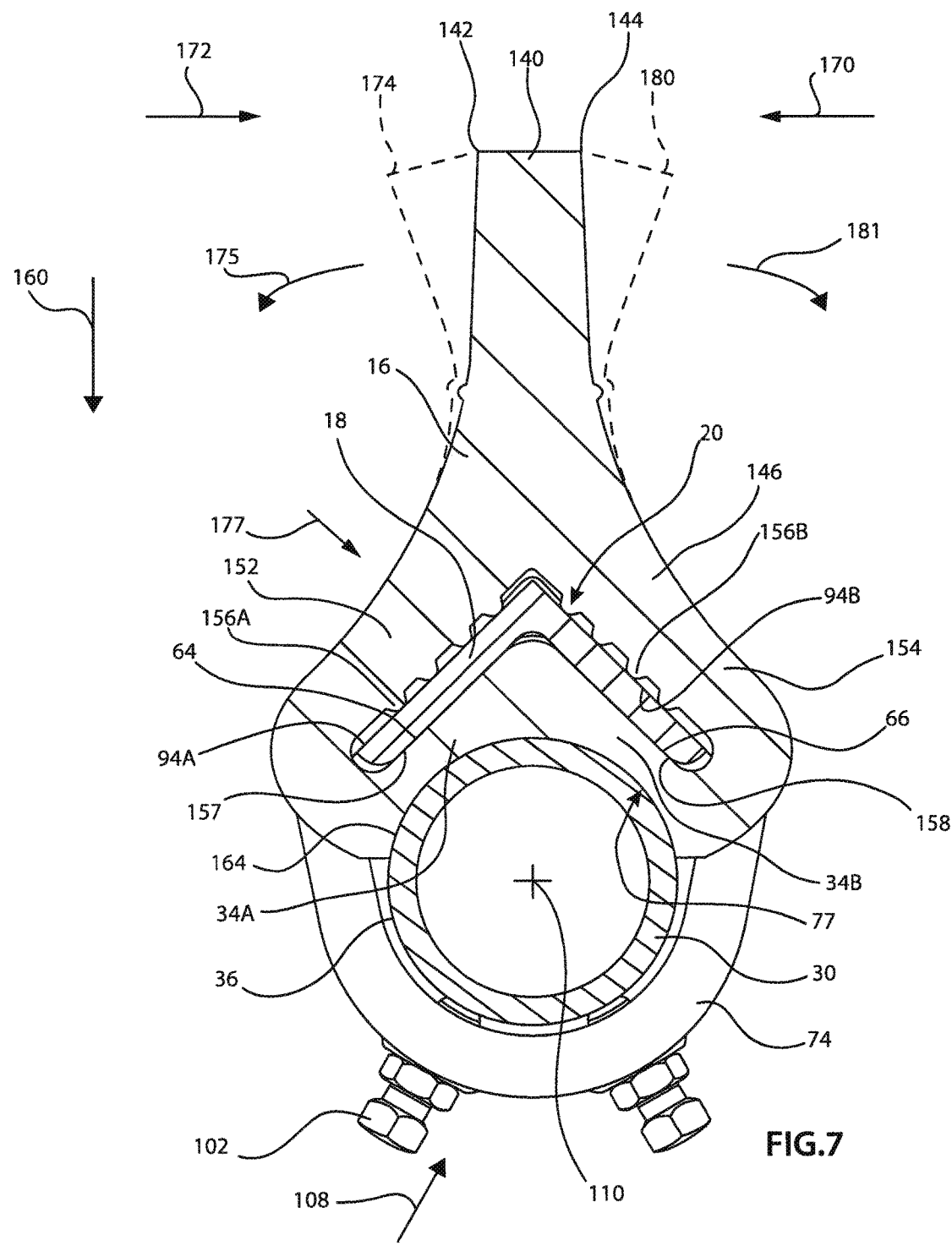
FIG. 7 is a cross-sectional view taken across line 7-7 in FIG. 1 showing the angle bar holding a base portion of the blade against an outer surface of the pole.

The support assembly 12 includes an elongate support, such as a pole 30, and a cleaner assembly securing mechanism 32 that releasably secures the cleaner assembly 14 to the pole 30. The cleaner assembly securing mechanism 32 has an unlocked configuration that permits the cleaner assembly 14 to be positioned on the pole 30 with lower surfaces of the blades 16 seated on the pole 30 and a locked configuration that secures cleaner assembly 14 to the pole 30 with the lower surfaces of the blades 16 seated on the pole 30. In one form, the cleaner assembly securing mechanism 32 includes a pair of clamps 72, 74 for clamping the angle bar 18 against seats 62, 63 (see FIG. 2) of the pole 30 and securing the angle bar 18 (and one or more blades 16 thereon) to the pole 30. With the blades 16 held against the pole 30, there is an interface 77 (see FIG. 7) between the blades 16 and the pole 30 including a base portion 34 (see FIG. 6) of each of the blades 16 which engages an outer surface 36 of the pole 30. With reference to FIGS. 6 and 7, the blades 16 each have a through opening 50 for receiving the angle bar 18 for extending therethrough. With the blades 16 carried on the angle bar 18 (see FIG. 3), the through openings 50 of the blades 16 are axially aligned to form an elongate through opening extending through the blades 16 and through which the angle bar 18 extends.

With the angle bar 18 extending through the blade through opening 50 and the blade base portion 34 resting on the pole outer surface 36 (see FIG. 7), shifting the clamps 72, 74 to a clamping configuration thereof draws the angle bar 18 downward against the seats 62, 63 and fixes the angle bar 18 to the seats 62, 63. With the clamps 72, 74 fixing the angle bar 18 to the seats 62, 63, the angle bar 18 and blades 16 mounted thereon are thereby held against vertical movement away from the pole 30, rotational movement about the pole 30, and linear movement along the pole 30. Shifting the clamps 72, 74 to the clamping configuration also urges the angle bar 18 against the blade base portion 34 and causes the angle bar 18 to hold the blade base portion 34 against the pole outer surface 36. Because the blade base portion 34 is held against the pole outer surface 36, the blade base portion 34 keeps debris such as fine particles and water from entering into the interface 77 and becoming lodged between the blade 16 and the pole 30 and adhering the blade 16 to the pole 30. The blades 16 may thereby be easily removed from the pole 30 even after extended periods of operation in environments with fine particulates.

The heights of the seats 62, 63 and the height of the blade base portion 34 may be configured to cause the clamped angle bar 18 to hold the blade base portion 34 against the pole 30 with a desired amount of pressure. For example, the blade base portion 34 may have a height slightly greater than the seats 62, 63 so that the angle bar 18 only slightly compresses the base portion 34 as the clamps 72, 74 clamp the angle bar 18 against the seats 62, 63. In another approach, the blade base portion 34 may be much taller than the seats 62, 63 so that the angle bar 18 has to compress the blade base portion 34 a greater distance before engaging the seats 62, 63 which results in a greater compression of the blade base portion 34. In yet another approach, the blade base portion 34 may be shorter than the seats 62, 63 so that the angle bar 18 does not compress the blade base portion 34 as the clamps 72, 74 clamp the angle bar 18 against the seats 62, 63. Even if the angle bar 18 does not compress the blade base portion 34, the angle bar 18 keeps the blade base portion 34 on the pole 34 and the contact between the blade base portion 34 and the pole 30 resists ingress of particulate matter therebetween. It will be appreciated that the heights of the blade base portion 34 and seats 62, 63 may be adjusted to provide a desired amount of compression of the blade base portion 34.

Another advantage of the conveyor belt cleaner 10 is that the blade base portion 34 may transmit some of the loading from the conveyor belt 13 directly to the pole 30. Examples of loading that can be transmitted include loading due to tension of the blade 16 against the belt 13, loading from a splice of the conveyor belt 13 striking the blade 16, and friction between the blade 16 and the conveyor belt 13. This configuration provides an improvement over prior conveyor belt tensioners that utilize scraper blades mounted to a rail and transmit all of the conveyor loading through the rail which requires a heavier and more expensive rail. Further, the rails of these prior conveyor belt cleaners generally have a more complex and difficult-to-manufacture geometry than the angle bar 18 and seats 62, 63 because the rails must fasten to both the scraper blades and the elongate support of these prior conveyor belt cleaners.

With reference to FIG. 1, the support assembly 12 may include a mount, such as resilient mount 40, at opposite ends of the pole 30 that urges the pole 30 and blades 16 thereon upwardly toward the conveyor belt 13 in direction 42. The resilient mounts 40 permit the pole 30 and blade 16 mounted thereto to shift in downward direction 44 away from the conveyor belt 13 in response to vertical loading on the blades 16, such as from splices traveling past the blades 16 or conveyor belt operation. The resilient mounts 40 are operable to resist rotation of the pole 30 about its center 132 (see FIG. 5) as well as lateral displacement of the pole 30 due to loads on the blade 16 from the conveyor belt 13. To accommodate lateral loads from the conveyor belt 13, such as due to friction from the conveyor belt 13, splice(s), or other surface irregularities of the conveyor belt 13 striking the blades 16, the blades 16 may be resilient and permit lateral deflection of a scraping portion 140 (see FIG. 7) such as to the illustrated position 174 or 180 before returning to scraping engagement with the conveyor belt 13. This operation is discussed in greater detail below. Thus, the resilient mount 40 and resilient blades 16 are configured to withstand vertical and lateral loading from the conveyor belt 13.

Figure 5:
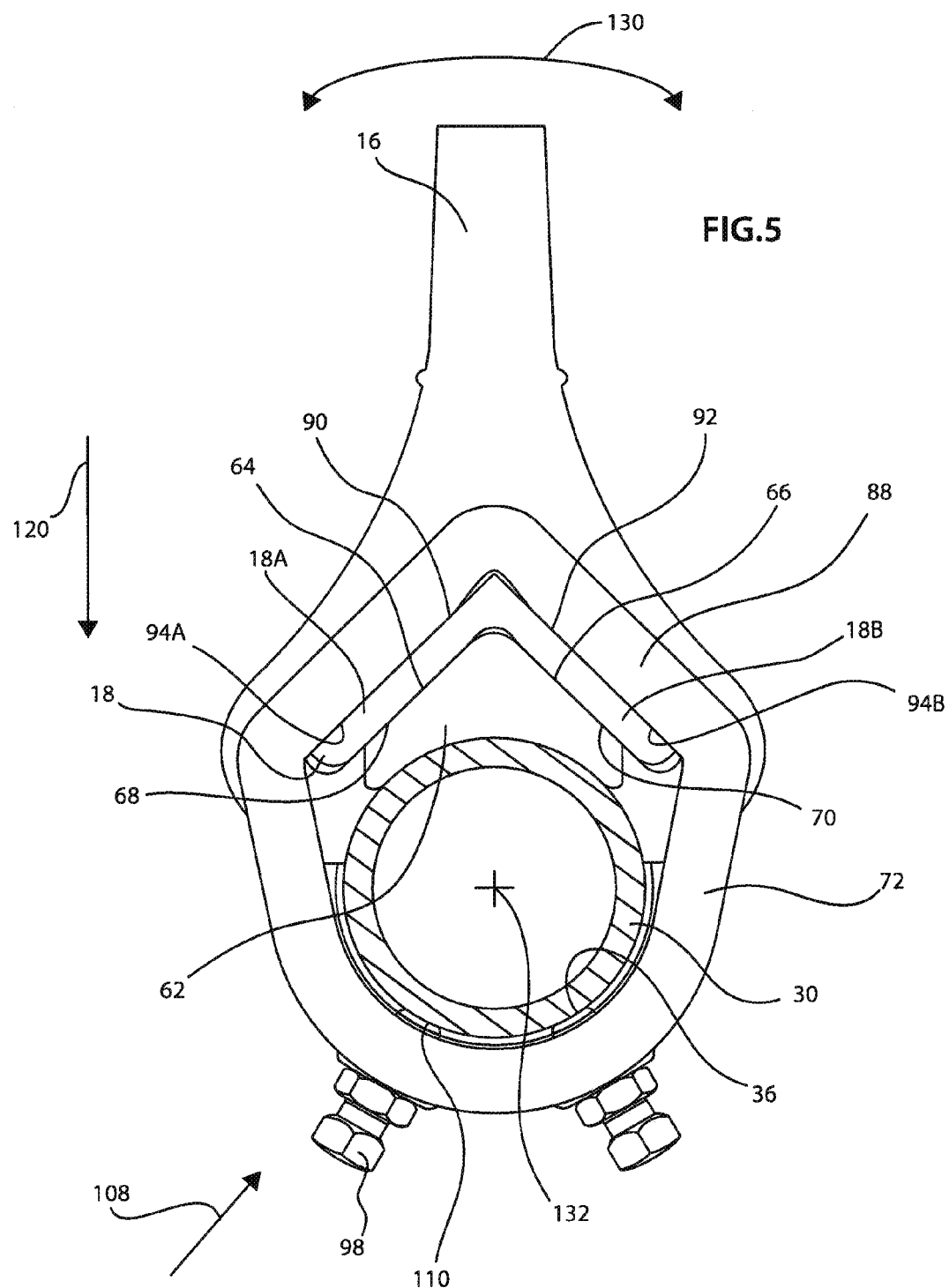
FIG. 5 is a cross-sectional view taken across line 5-5 in FIG. 1 showing the clamp holding the angle bar against a seat of the pole which secures the angle bar and scraper blades thereon to the pole.

With reference to FIGS. 2 and 5, the angle bar 18 has a pair of flanges or sections 18A, 18B extending at an angle transversely relative to each other that are oriented to form an inverted, generally V-shaped cross-section of the angle bar 18. In one form, the sections 18A, 18B are oriented to extend at an included angle relative to each other in the range of approximately sixty degrees to approximately one hundred and twenty degrees, and such as approximately ninety degrees. The widths of the sections 18A, 18B may be different so that the cross section of the angle bar 18 resembles an "L" shape rather than a traditional V shape with sections 18A, 18B of the same width. For convenience, the term "V-shaped" is used herein to encompass both evenly sized sections 18A, 18B as well as sections 18A, 18B having different widths.

The angle bar 18 may be made from commercially available angle bar stock that needs only to be cut to the appropriate length before being used to secure the blades 16 to the pole 30. For example, the angle bar 18 may be commercially available quarter-inch-thick angle steel or aluminum with dimensions of two inches by two inches. By using commercially available angle bar stock, the angle bar 18 may be readily replaced by a customer using on-site angle bar stock if the angle bar 18 shipped with the conveyor belt cleaner 10 is damaged such as during conveyor belt operation. In another approach, the angle bar 18 may be specially configured for use with the conveyor belt cleaner 10.

The angle bar 18 and pole 30 may be rigid and do not significantly deform during normal conveyor belt operations. However, any deformation of the angle bar 18 and pole 30 would be due to localized heavy loading during conveyor belt operations. In any event, the angle bar 18 and pole 30 have a greater rigidity than the scraper blade body 147 which is intended to resiliently deform during normal operation.

With reference to FIG. 2, the seats 62, 63 of the pole 30 have an inverted, generally V-shaped outer profile configured for mating engagement with the angle bar 18 when the angle bar 18 is positioned on the seats 62, 63. More specifically, the angle bar 18 has angled transverse inner surfaces 64, 66 and the seats 62, 63 each have corresponding inclined transverse seating surfaces 68, 70. The seating surfaces 68, 70 are inclined relative each other at an angle corresponding to the angle between the inner surfaces 64, 66 of the angle bar 18. The seats 62, 63 may be made of steel and connected to the pole 30 using, for example, welding or fasteners. In another form, the seats 62, 63 are formed integrally with the pole 30 so that the pole 30 and seats 62, 63 have a unitary construction.

Once the angle bar 18 has been positioned on the seats 62, 63 and the clamps 72, 74 positioned onto the angle bar 18 (as discussed in greater detail below), shifting the clamps 72, 74 to the clamping configuration tightly draws the mating inclined surfaces 64, 66 and 68, 70 of the angle bar 18 and seats 62, 63 together into engagement with one another so that there is a rigid, mating connection between the angle bar 18 and the seats 62, 63 as shown in FIG. 5. This mating connection substantially precludes rotary movement of the angle bar 18 in directions 130 about the center 132 of the pole 30. As shown in FIG. 5, the angle bar 18 is sandwiched between an upper clamping portion 88 (see FIG. 4) of the clamps 72, 74 and the seats 62, 63 of the elongate pole 30. This forms a rigid and secure arrangement of the angle bar 18 (with blades 16 thereon), the clamps 72, 74, and the pole 30.

Returning to FIG. 2, the blades 16 may be easily and quickly mounted on the angle bar 18 which may, in turn, be easily and quickly secured to the pole 30 using the clamps 72, 74. More specifically, the through openings 50 of the blades 16 are sized to receive an end 52 of the angle bar 18 as the blades 16 are manually pushed or pulled onto the angle bar 18 to be slid in direction 54 thereon. Although the blades 16 may be readily pushed or pulled onto the angle bar 18, the blade 16 has interior surfaces 51 (see FIG. 6) extending about the opening 50 that provide frictional resistance to sliding of the blade 16 along the bar 18 so that the blades 16 generally stay in position along the angle bar 18 once they have been slid onto the bar 18. This frictional resistance operates as a temporary retention device keeping the blades 16 on the angle bar 18 and making it easier for an operator to transport and position the angle bar 18 and blades 16 mounted thereon.

In one approach, an operator inserts the end 52 of the angle bar 18 into the through opening 50 of a lead blade 16A and then slides the lead blade 16A in direction 54 until the lead blade 16A reaches an end position 55 (see FIG. 2) next to an end securing portion 80 of the angle bar 18. The end 52 of the angle bar 18 is then inserted into and through the through opening 50 of each of the other blades 16 and the blades 16 are slid along the angle bar 18 until the flat, vertical side surfaces 57 of the blades 16 abut one another (see FIG. 3). In another approach, the blade 16A is loaded from end 53 of the angle bar 18 directly onto an end position 55. The end 52 of the angle bar 18 is then inserted into and through the openings 50 of the remaining blades 16 and the blades 16 are slid in direction 54 along the angle bar 18 in direction 54 until the blades 16 abut the blade 16A at the end position 55. In yet another approach, a single elongate monolithic blade 16 may be used such that only one blade 16 needs to be slid onto the angle bar 18.

With reference to FIG. 3, the blades 16 are shown having been slid onto the angle bar 18 and positioned with the side surfaces 57 of the blades 16 abutting each other. As shown in FIGS. 6 and 7, the blades bodies 146 include lower mounting portions 147 extending around the openings 50 and angle bar 18 received therein such that there are generally no exposed outer surfaces of the angle bar 18 at the interface 58 between adjacent ones of the blades 16. The blades 16, and specifically the lower mounting portions 147 (see FIG. 6) thereof with the inverted V-slot through opening 50, thereby enclose an intermediate section 59 of the angle bar 18 which reduces the likelihood of debris entering into the interface 20 between the blades 16 and the angle bar 18 along the intermediate section 59 (see FIG. 3) of the angle bar 18. Further, the abutting side surfaces 57 of the blades 16 will operate as a seal to reduce the likelihood of debris entering into the locations 58 between the blades 16. In other approaches, the blade lower mounting portion 147 of each blade 16 may extend about less than the entire angle bar 18 such that some of the outer surfaces of the bar 18 are exposed, such as portions of the surfaces 64, 66 in FIG. 3.

With reference to FIG. 2, once the blades 16 have been slid to respective positions along the angle bar 18, the angle bar 18 is then moved in downward direction 60 toward the pole 30 to seat the lower, downwardly facing or inner surfaces 64, 66 of the angle bar 18 against the upper, upwardly facing or inclined surfaces 68, 70 of the seats 62, 63. Next, the clamps 72, 74 are shifted in direction 76 axially along the pole 30 and into position aligned with securing portions 80, 82 (see FIGS. 2 and 3) of the angle bar 18. The operator then tightens set screws 98 of the clamps 72, 74 to shift the clamps 72, 74 to the clamping configuration thereof as discussed in greater detail below. Positioning and locking the clamps 72, 74 on the angle bar securing portions 80, 82 on opposite sides of the series of abutting blades 16 carried on the angle bar 18 captures the blades 16 in abutting contact on the angle bar 18 axially between the clamps 72, 74.

Shifting the clamps 72, 74 to the clamping configuration thereof also causes the angle bar 18 to firmly hold the blade base portion 34 of each of the respective blades 16 against the pole outer surface 36. Thus, with the cleaner assembly 14 secured to the pole 30, the blades 16 extend about the section of angle bar 18 received therein to restrict debris from entering into the interface 20 between each blade 16 and the angle bar 18 and the laterally abutting blades 16 restrict debris from entering into the interfaces 58 between the blades 16. Further, with, the blade base portions 34 held against the pole outer surface 36 by the angle bar 18 and clamps 72, 74, the blade base portions restrict debris from entering into the interface 77 between the blades 16 and the pole 30. The cleaner assembly 14 thereby reduces the likelihood of debris getting caught between the blades 16 and the angle bar 18 as well as reduces the likelihood of debris getting caught between the blades 16 and the pole 30 and making difficult separation of the blades 16 from the angle bar 18 or separation of the blades 16 from the pole 30.

Figure 4:
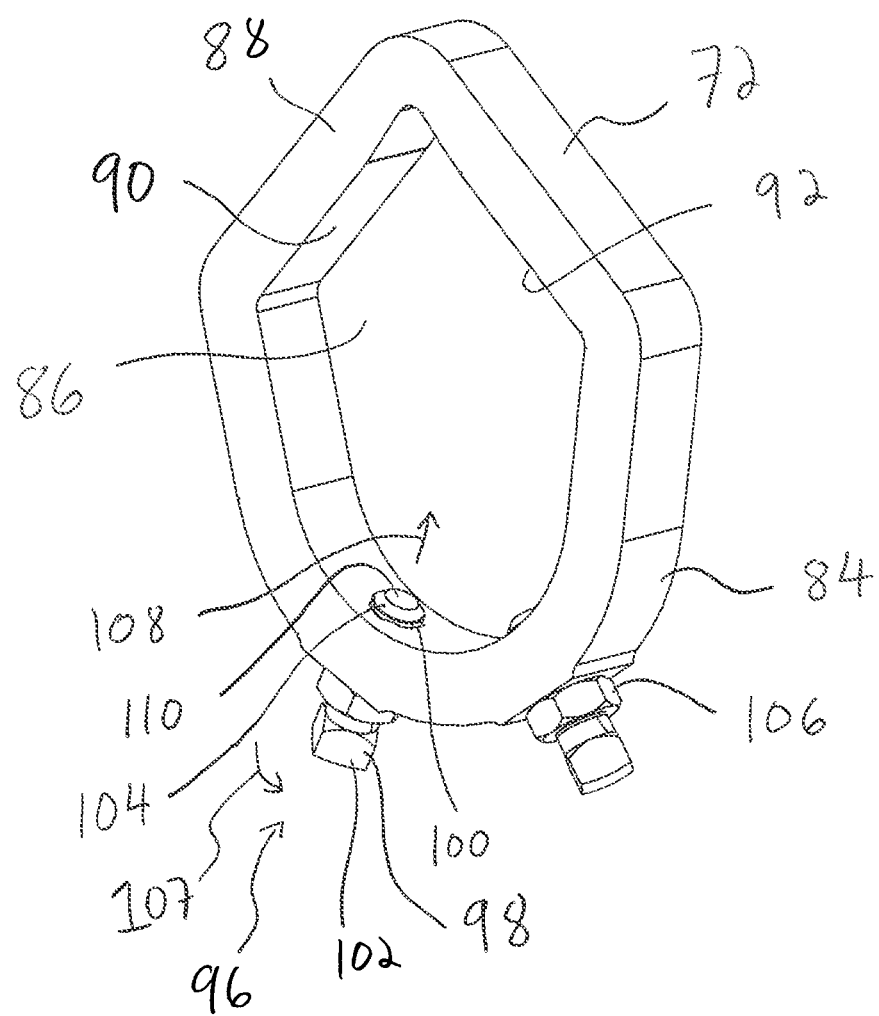
FIG. 4 is a perspective view of a clamp of the conveyor belt cleaner of FIG. 1 showing set screws for contacting an underside of the pole.

With reference to FIG. 4, the clamps 72, 74 are identical so that further details of the clamps 72, 74 will be discussed with respect to clamp 72. The clamp 72 has a body 84 with an opening 86 sized to receive the pole 30 extending therethrough. The opening 86 provides sufficient clearance between the body 84 and the pole 30 to permit the clamps 72, 74 to be moved longitudinally along the pole 30 in axial direction 76 (see FIG. 2) onto the angle bar 18 to secure the angle bar 18 to the pole 30 or in opposite axial direction 78 off of the angle bar 18 to remove the angle bar 18 (and blades 16 carried thereby) from the pole 30. As shown in FIG. 4, the clamp body 84 includes the upper clamping portion 88 which engages the angle bar 18 and draws the angle bar 18 against the seats 62, 63 upon shifting of the clamps 72, 74 to the clamping configuration thereof. The clamping portion 88 has an inverted V-shape configured to mate with the inverted V-shape of the angle bar 18 positioned on the pole seats 62, 63. With reference to FIG. 4, the clamping portion 88 includes inclined clamping surfaces 90, 92 configured to form a mating engagement with outer surfaces 94A, 94B (see FIG. 2) of the angle bar 18. In addition to providing a mating engagement between the clamping portion 88 and the angle bar 18, contact between the inclined clamping surfaces 90, 92 and the angle bar outer surfaces 94A, 94B may operate to re-orient the clamp body 84 about the pole 30 (see FIG. 5) in the situation where the clamps 72, 74 are rotationally misaligned about the pole 30 relative to the angle bar 18 on the seats 62, 63.

With reference to FIG. 4, the clamp 72 includes a clamp actuator 96 for shifting the clamp 72 between a release configuration that permits movement of the clamp 72 along the angle bar 18 and pole 30 and a clamping configuration for securing the angle bar 18 (and blades 16 carried thereby) to the pole 30. In one form, the clamp actuator 96 includes the set screw 98 threadingly engaged within a lower threaded opening 100 of the body 84, the set screw 98 having a proximal head end 102 and a distal engagement end 104. Turning the set screw 98 in tightening direction 107 shifts the set screw 98 and distal engagement end 104 thereof in direction 108 in the clamp opening 86 to cause a distal surface 110 of the set screw 98 to engage the pole outer surface 36 (see FIG. 5). The clamp 72 includes a jam nut 106 positioned on the shank of the set screw 98. The jam nut 106 may be moved along the shank into engagement with the clamp body 84 to lock the set screw 98 in position relative to the body 84. The jam nut 106 may keep the set screw 98 from vibrating loose during operation of the conveyor belt 13.

FIG. 5 is an end elevational view of the removable cleaner assembly 14 mounted on the pole 30. Once the clamps 72, 74 have been shifted in axial directions 76 onto the angle bar securing portions 80, 82 (see FIGS. 2 and 3), the set screws 98 are tightened so that the set screw distal surface 110 engages with the pole outer surface 36. Continued tightening of the set screw 98 draws the clamping surfaces 90, 92 (see FIG. 4) of the clamps 72, 74 in direction 120 against the outer surfaces 94A, 94B of the angle bar 18. This draws the angle bar 18 and inner surfaces 64, 66 thereof into tight engagement with the seat surfaces 68, 70. In this manner, the clamps 72, 74 fix the angle bar 18 to the seats 62, 63 of the pole 30. To shift the clamps 72, 74 to the released configuration for releasing the angle bar 18 from the seats 62, 63, the set screws 98 are turned in a loosening direction opposite direction 107 to disengage the set screw distal surface 110 from the pole outer surface 36. The clamps 72, 74 are then slid in axial directions 68 (see FIG. 2) off of the angle bar 18 such that the angle bar 18 (and blades 16 thereon) may be lifted in direction 61 off of the seats 62, 64 of the pole 30.

With reference to FIG. 6, the blade body 146 may have a unitary construction including the scraping portion 140 with edges 142, 144 for scraping engagement with the conveyor belt 13 and the lower mounting portion 147 for being mounted to the angle bar 18 and the pole 30. Because the scraping portion 140 has scraping edges 142, 144 on opposite lateral sides of the scraping portion 140, the blade 16 is bidirectional and can scrape material from the conveyor belt 13 when the belt 13 travels in direction 170 or 172 past the scraping edges 142, 144. With reference to FIG. 3, the blade scraping portions 140 have a rectangular cross-sectional configuration and include a flat, horizontal top end surface 145 extending between the edges 142, 144. The scraping edges 142, 144 are straight and extend along opposite sides of the top end surface 145. It will be appreciated that the scraping edges 142, 144 may extend along less than the entire length of the top end surface 145 and may have different shapes, such as segmented edges rather than a single straight edge.

Further, the blades 16 are configured to resiliently deflect in response to lateral loading from the conveyor belt 13 in either direction 170 or 172. For example, if the conveyor belt 13 is traveling in direction 170, a splice of the conveyor belt 13 may impact the scraping edge 144 of one of the blades 16, bend the blade body 146, and deflect the scraping portion 140 to position 174 shown in FIG. 6. The blade body 146 then returns the scraping portion 140 and edge 144 thereof into engagement with the conveyor belt 13 after the splice has traveled downstream beyond the edge 144. The bending of the blade body 146 to accommodate deflection of the scraping edge 144 varies according to the impact force imparted on the edge 144 with a greater impact force producing a corresponding larger bend of the body 146. The blade body 146 has a spring-like behavior in that the body 146 urges the scraping portion 140 back toward its undeflected position with a force proportional to the deflection of the scraping portion 140 due to the impact. Thus, the farther the scraping portion 140 has been deflected, the greater the restoration force the body 146 applies to quickly urge the scraping portion 140 back into engagement with the belt 13.

The removable cleaner assembly 14 may include several cleaner blades 16 each with scraping edges 142, 144 that together extend for substantially the full width of the conveyor belt 13. In this manner, the full width of the conveyor belt 13 is scraped clean by the edges 142 or 144 (depending on the direction of movement of the conveyor belt 13) while allowing for individual deflection of the blades 16 as they encounter conveyor belt irregularities that do not necessarily extend across the full width of the belt 13. Accordingly, while one of the blade scraping portions 140 may be deflected due to an impact with a conveyor belt irregularity, the scraping portions 140 of the other blades 16 can remain in tight engagement with the belt 13.

In one approach, the unitary bodies 146 of the blades 16 are made of a resilient material such as urethane or rubber to permit deflection of the scraping portion 140 thereof and accommodate impacts from the conveyor belt 13. The term resilient with reference to the bodies 146 is intended to mean the bodies 146 can bend or deform and rebound back into an original configuration without permanent deformation during ordinary operating conditions. To permit deflection of the scraping edge 144, the body 146 has a thickness 139 (see FIG. 6) in the direction of conveyor movement that is less than half a height 141 (see FIG. 3) of the blade 16 above wear indicators 143 of the blade 16. In one approach, the thickness 139 is approximately 0.8125 inches and the height 141 is approximately two inches.

With respect to FIG. 6, if the conveyor belt 13 is traveling in direction 172, an irregularity of the conveyor belt 13 (such as a splice) may impact the scraping edge 142 and deflect the scraping portion 140 to position 180. Alternatively, if the conveyor belt 13 is traveling in direction 170, the irregularity may impact the scraping edge 144 and deflect the scraping portion 140 to position 174. Whether the conveyor belt 13 is traveling in direction 172 or 170, the blade body 146 resiliently urges the scraping portion 140 back toward its undeflected position in engagement with the conveyor belt. The bidirectional, resilient configuration of the blade 16 permits the blade 16 to be used in many different conveyor belt applications. For example, one application for a bidirectional blade 16 is a conveyor belt for selectively conveying materials to side-by-side silos. The conveyor belt is loaded in the middle of the conveyor belt and the conveyor belt is operated in one direction to convey material to one of the silos and operated in the other direction to convey material to the other silo. In either conveyor belt direction, one of the edges 142, 144 will engage and clean the conveyor belt.

Another advantage of the bidirectional configuration of the blade 16 is that the body 146 resiliently urges the scraping portion 140 back toward the undeflected position thereof whether the conveyor belt 13 is traveling in direction 170 or 172 (see FIG. 7). If the conveyor belt 13 normally travels in direction 170 but may roll backward in direction 172 after the conveyor belt 13 is turned off, the conveyor belt 13 may shift the scraping portion 140 to position 180 due to the weight of the material on the conveyor belt 13. The body 140, however, will resiliently urge the scraping portion 140 in direction 175 back toward the undeflected position thereof. Thus, the blade 16 provides the additional advantage of bringing the scraping edges 142, 144 back into engagement with the conveyor belt 13 despite roll-back from the conveyor belt 13 after the conveyor belt 13 has been shut off.

With reference to FIG. 6, the body 146 of the blade 16 is configured to transmit vertical and lateral loading from the conveyor belt 13 to the angle bar 18 and the pole 30. More specifically, the blade body 146 includes the through opening 50 sized to receive the angle bar 18 and legs 138A, 138B.

The through opening 50 includes leg opening portions 137A, 137B extending through the legs 138A, 138B. The legs 138A, 138B include leg upper sections 148, 150 and leg lower sections 34A, 34B. The leg upper sections 148, 150 have upper support portions 152, 154 with structures, such as protrusions 156A, 156B, for engaging the outer surfaces 94A, 94B of the angle bar 18 in response to vertical and lateral loading from the conveyor belt 13 as discussed in greater detail below. The protrusions 156A, 156B permit the width 157 between upper and lower surfaces 159, 161 across the slot opening 50 to be made wider to provide more clearance for the angle bar 18 to be slid through the opening 50 while permitting the protrusions 156A, 156B to engage the angle bar 18 and resist deflection of the leg upper sections 148, 150. It will be appreciated that the smaller the surface area of the blade body 146 contacting the angle bar 18 about the opening 50, the less the frictional resistance when installing the blade 16 on the angle bar 18 or removing the blade 16 from the angle bar 18. The protrusions 156A, 156B thereby reduce the frictional resistance because lower tip portions of the protrusions 156A, 156B contact the outer surfaces 94A, 94B of the angle bar 18 rather than the entire upper surface 159. In another form, the protrusions 156A, 156B may be located on leg lower sections 34A, 34B of the blade base portion 34 on the lower side of the opening 50 and the blade support portions 152, 154 may have flat surfaces similar to surfaces 157, 158. In yet another form, the protrusions 156A, 156B may be distributed on both the upper and lower sides of the opening 50, i.e., on the blade support portions 152, 154 and on the leg lower sections 34A, 34B.

With reference to FIG. 6, blade 16 has an inverted, generally Y-shape. The blade base portion 34 includes a pair of inclined inner surfaces 158A, 158B that are complimentary to the inner surfaces 64, 66 of the angle bar 88 once the angle bar 18 has been advanced through the opening 50 and the clamps 72, 74 slid onto the angle bar 18 to securing positions 80, 82 thereof. With reference to FIG. 7, turning the set screws 98 in direction 107 (and corresponding inward movement of the set screws 98 in direction 108) causes the clamping portions 88 of the clamps 72, 74 to draw the inner surfaces 64, 66 of the angle bar 18 downwardly against surfaces 158A, 158B (see FIG. 6) of the blade base portion 34 and causes the angle bar 18 to hold the blade base portion 34 against the pole outer surface 36. In this manner, using the clamps 72, 74 to clamp the angle bar 18 against the seats 62, 63 also secures the base portion 34 of the blades 16 between the angle bar 18 and the pole outer surface 36.

When the conveyor belt cleaner 10 is initially installed at the conveyor belt 13, the support assembly 12 may be arranged to apply a tensioning force to the blades 16 which presses the blades 16 (for example) vertically upward against the conveyor belt 13. This tensioning force of each blade 16 against the conveyor belt 13 produces vertical loading on the blade 13 that urges the scraping portion 140 and leg upper sections 148, 150 vertically downward in direction 160 toward the pole 30 as shown in FIG. 7. This in turn urges the blade protrusions 156A, 156B against the outer surfaces 94A, 94B of the angle bar 18. The tensioning force of each blade 16 against the conveyor 13 is transmitted from the blade protrusions 156A, 156B and through the angle bar 18, blade base portion 34, and pole 30. Because the angle bar 18 is supported along the intermediate section 59 (see FIG. 3) by the base portion 34 of each of the blades 16, the angle bar 18 generally does not deflect due to this compressive loading from the blade leg upper sections 148, 150. Instead, the angle bar 18 transmits the tensioning forces to the base portions 34 held between the angle bar 18 and the pole 30. In this manner, the blade base portion 34 transmits the vertical loading to the pole 30 rather than through the seats 62, 63. This is especially advantageous near the middle of the intermediate section 59 (see FIG. 3) of the angle bar 18 which is farthest from the seats 62, 63 and therefore least supported against vertical loading by the seats 62, 63.

With reference to FIG. 7, operation of the conveyor belt 13 also imparts lateral loads on the blade scraping portion 140. For example, if the conveyor belt 13 travels in direction 170 and a splice of the conveyor belt 13 impacts the edge 144, the scraping portion 140 may deflect to position 174 and urge the scraping portion 140 to otherwise pivot in direction 175 about the pole 30. However, the angle bar 18 extending through the opening 50 in the body 146 resists pivotal movement of the blade body 146 in direction 175 because the angle bar 18 is rigidly fixed to the seats 62, 63 by the clamps 72, 74. Further, the blade base portion 34 may transmit a portion of this lateral loading directly to the support pole 30.

The blade 16 may be made of a sufficiently stiff resilient material, such as polyurethane or rubber, in order to return the scraping edge 144 into engagement with the conveyor belt 13 after the impact from the conveyor belt splice. More specifically, the pivoting of the scraping portion 140 in direction 175 causes the blade leg upper section 148 and the leg lower section 34A to generally be placed in compression in direction 177 against the angle bar 18 and the pole 30. This causes the protrusions 156A of the leg support portion 152 to be resiliently urged against the angle bar outer surface 94A and the leg lower section 34A to be resiliently urged against the pole outer surface 36 such that the leg upper section 148 (and scraping portion 140 connected thereto) is restricted from further pivoting in direction 175. The lateral loading in direction 170 also causes the blade leg upper section 150 (see FIG. 6) and a lower leg section 34B to generally be placed in tension and pulled away from the angle bar 18 and pole 30. The stiff, resilient material of the blade body 146 resists the compression of the leg upper section 148 and leg lower section 34A and the tensioning of the blade leg upper section 150 and leg lower section 34B. The stiff, resilient material of the blade body 146 thereby returns the scraping portion 140 and edge 144 toward the undeflected position thereof after the conveyor belt splice has traveled past the blade 16.

In addition to the material of the blade body 146, the leg upper sections 148, 150 each have relatively large thickness 176 (see FIG. 6) which provides sufficient strength for resisting the compression and tension caused by vertical and lateral loading from the conveyor 13. The blade body 146 includes a neck 149 connecting the scraping portion 140 to the legs 138A, 138B. The neck 149 has a substantially volcano shape including outer surfaces on opposite sides of the blade 16 each having a center of curvature 151 and a radius 153 about the center 151. The radius 153 is sized to provide material at the lower end of the scraping portion 140 to resist deflection of the scraping portion 140 and make the blade 16 sufficiently stiff. For example, the blade 16 may have an overall vertical height in the range of approximately four inches to approximately six inches, such as approximately five inches. The radius 153 may be in the range of approximately two inches to approximately six inches, such as approximately 4.25 inches.

It is possible for there to be a gap between the leg support portion 152 and the angle bar outer surface 94A prior to the imperfection of the conveyor belt 13 striking the edge 144 in direction 170. The resulting pivoting of the scraping portion 140 in direction 175 causes the protrusions 156A to shift or rock into engagement with the angle bar outer surface 94B and take up the gap or clearance therebetween. Engagement of the protrusions 156A with the angle bar outer surface 94A resists further deflection of the leg upper section 148.

When the lateral loading from the imperfection of the conveyor belt 13 is applied in direction 172, the scraping portion 140 may deflect to position 180 which tends to pivot the blade body 146 in direction 181 (see FIG. 7). This places the leg upper section 150 and leg lower section 34B in compression and the leg upper section 148 and leg lower section 34A in tension in a manner opposite to lateral loading in direction 170. This causes the protrusions 156B of the leg support portion 154 to be resiliently urged against the outer surface 94B of the angle bar 18 and the leg lower section 34B to be resiliently urged against the support pole outer surface 36. If there is initially a gap between the protrusions 156B and the outer surface 94B, the pivoting of the scraping portion 140 in direction 181 causes the protrusions 156B to shift or rock into engagement with the angle bar outer surface 94B and resist further deflection of the leg upper section 150 (and scraping portion 140 supported thereby) in direction 181.

Figure 8:
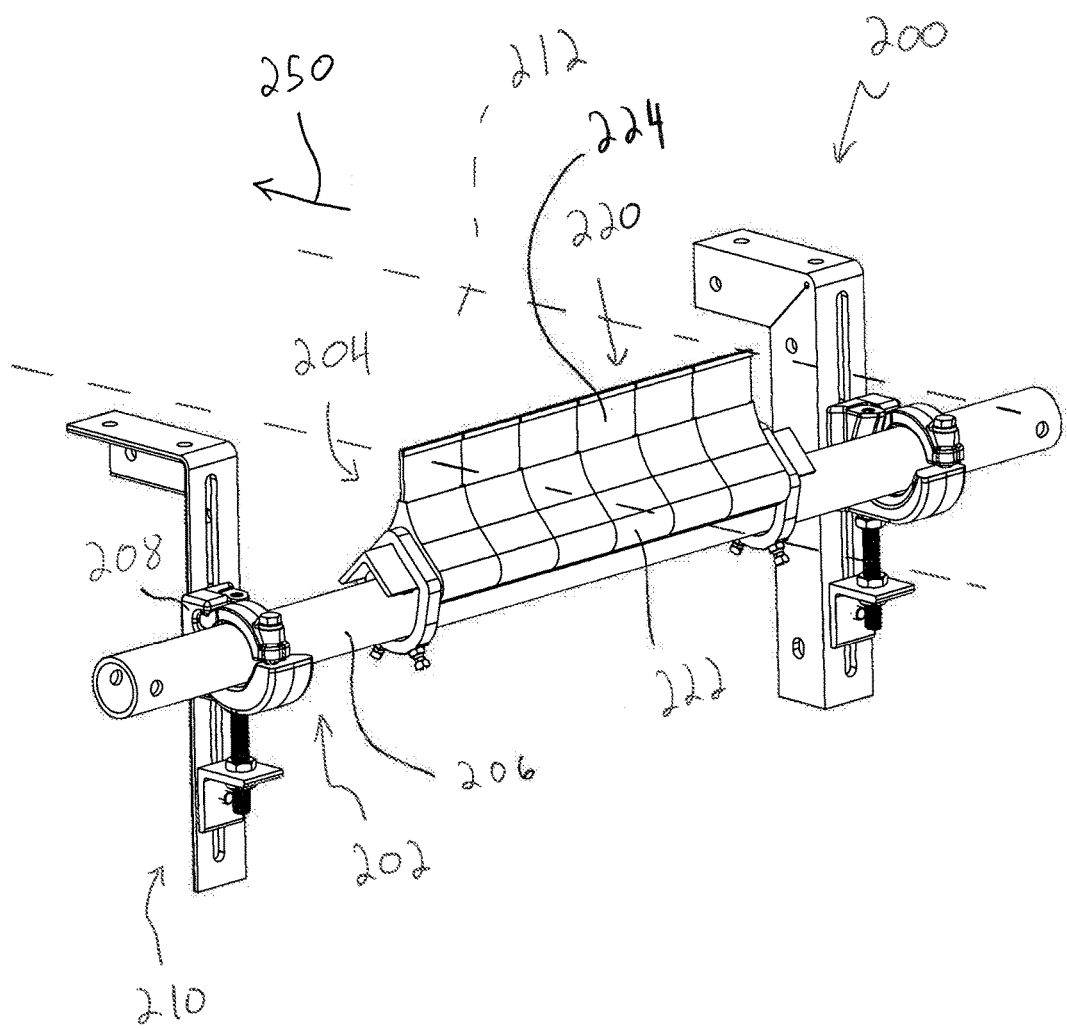
FIG. 8 is another conveyor belt cleaner having a removable cleaner assembly including scraper blades with resilient bodies and rigid inserts.

With reference to FIG. 8, another conveyor belt cleaner 200 is shown having a support assembly 202 and a removable cleaner assembly 204 that may be easily and quickly connected to the support assembly 202. There are many similarities between the conveyor belt cleaner 200 and the conveyor belt cleaner 10 discussed above such that differences between the two will be highlighted. For example, the support assembly 202 includes a pole 206 secured to a pole holding device 208 of a rigid mount 210. The mount 210 permits adjustment of the vertical position of the pole 206 during installation at a conveyor 212, but generally resists vertical movement of the pole 206 during operation of the conveyor 212.

Another difference is that the removable cleaner assembly 204 has one or more blades 220 each having a cushion or body 222 and an insert 224 secured to the body 222. The inserts 224 are generally rigid and do not deform during normal conveyor belt operation while the bodies 222 are made of a resilient material and deflect to withstand loading applied to the inserts 224 from the conveyor belt 212. By way of example, the blade body 222 may be made of polyurethane or rubber, the plate 242 made of steel, and the tip 246 made of carbide. The conveyor belt cleaner 200 utilizes the resilient body 222 of each blade 220 to permit deflection of the associated insert 224 in response to the insert 224 contacting an irregularity of the conveyor belt 212 without the use of a resilient mount 40 as in the cleaner 10 discussed above. The conveyor belt cleaner 200 may therefore be simpler in this respect. It will be appreciated, however, that the blades 14 may alternatively be used with the support assembly 202 and the blades 220 used with the support assembly 12.

Figure 9:
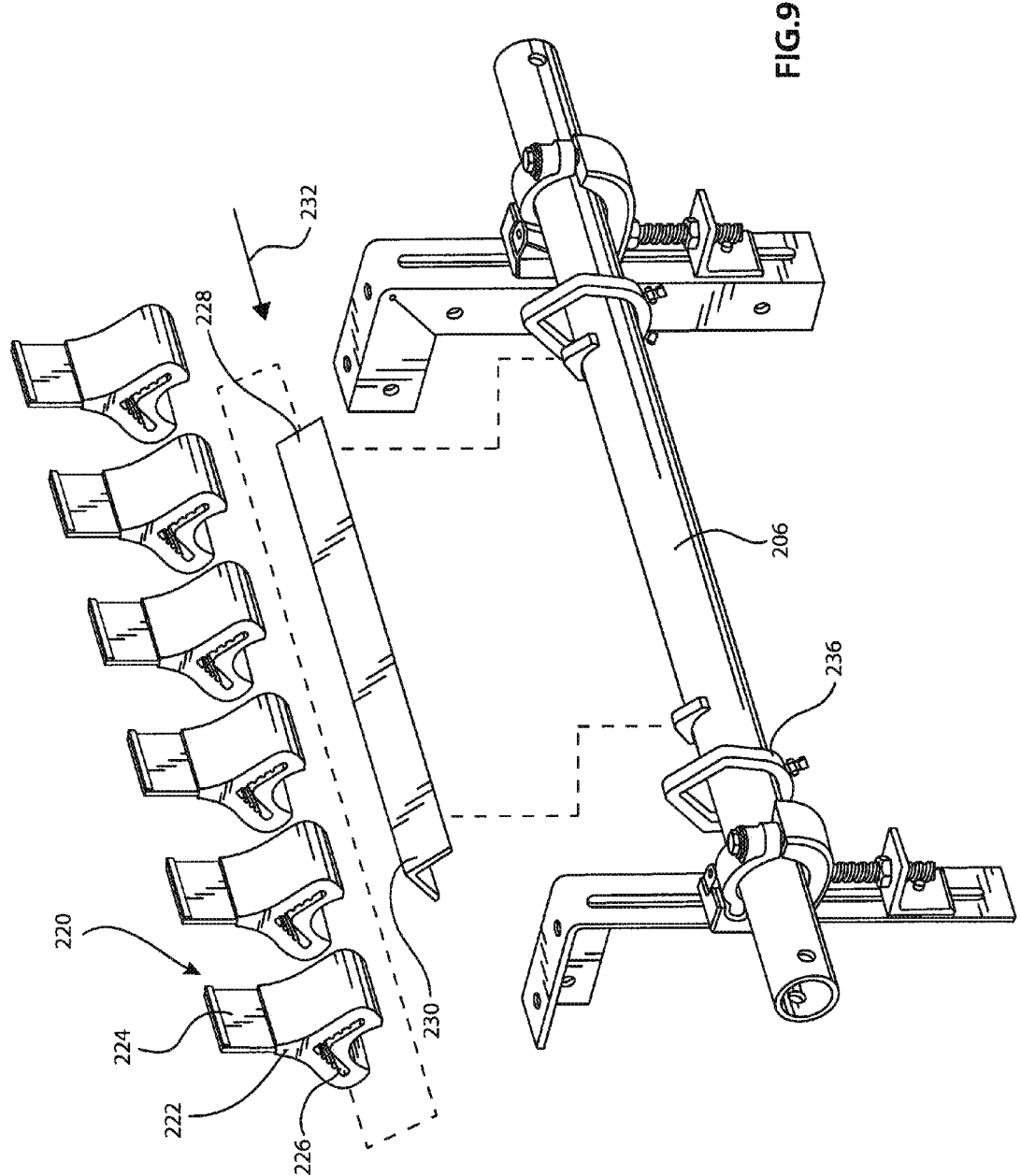
FIG. 9 is an exploded view of the conveyor belt cleaner of FIG. 8 showing the assembly of the scraper blades onto an angle bar which is in turn secured to a support pole of the conveyor belt cleaner.

With reference to FIG. 9, the blade bodies 222 have through openings 226 sized to permit the blades 220 to slide onto an end 228 of an angle bar 230 in direction 232 in order to mount the one or more blades 220 on the angle bar 230. The angle bar 230 then may be secured to the pole 206 of the support assembly 202 using clamps 236.

Figure 10:
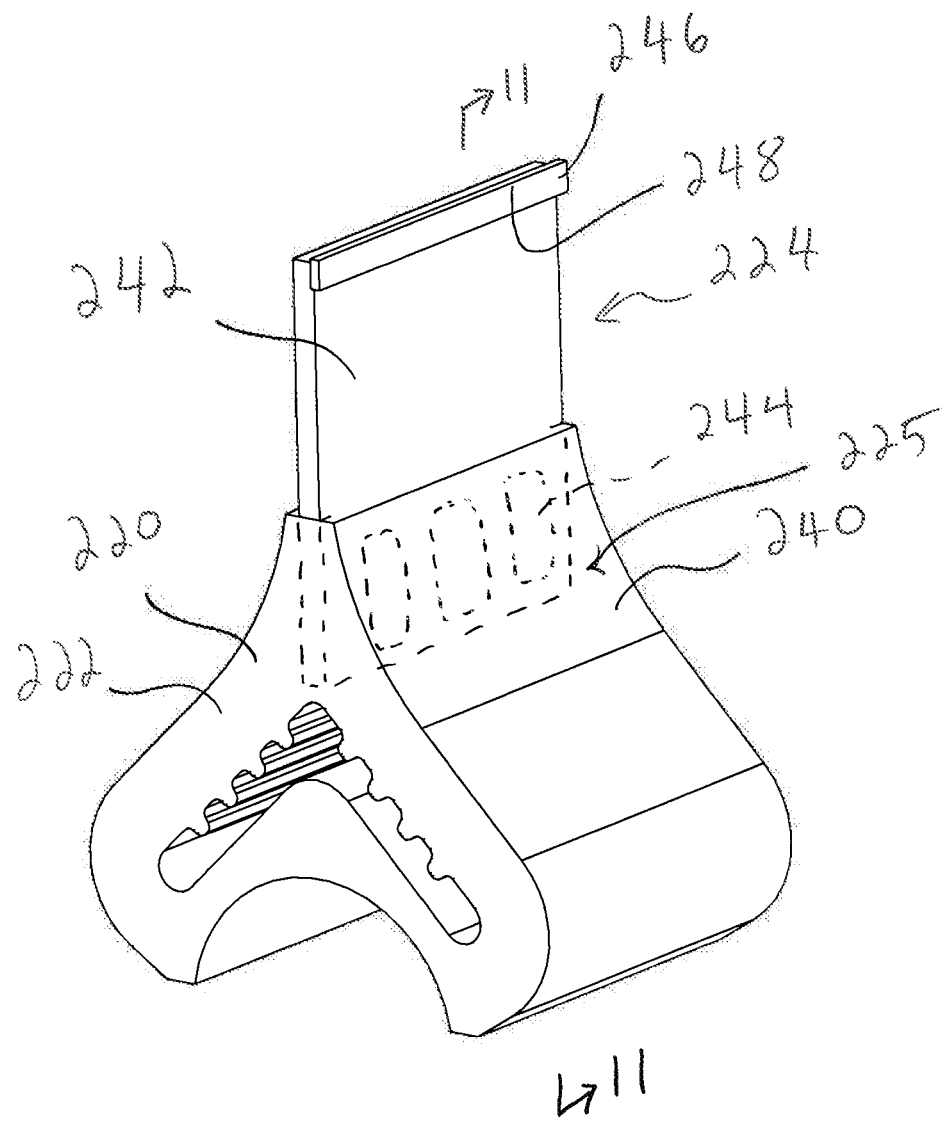
FIG. 10 is a perspective view of one of the scraper blades of FIG. 8 showing a plate of the insert anchored in the resilient body.
Figure 11:
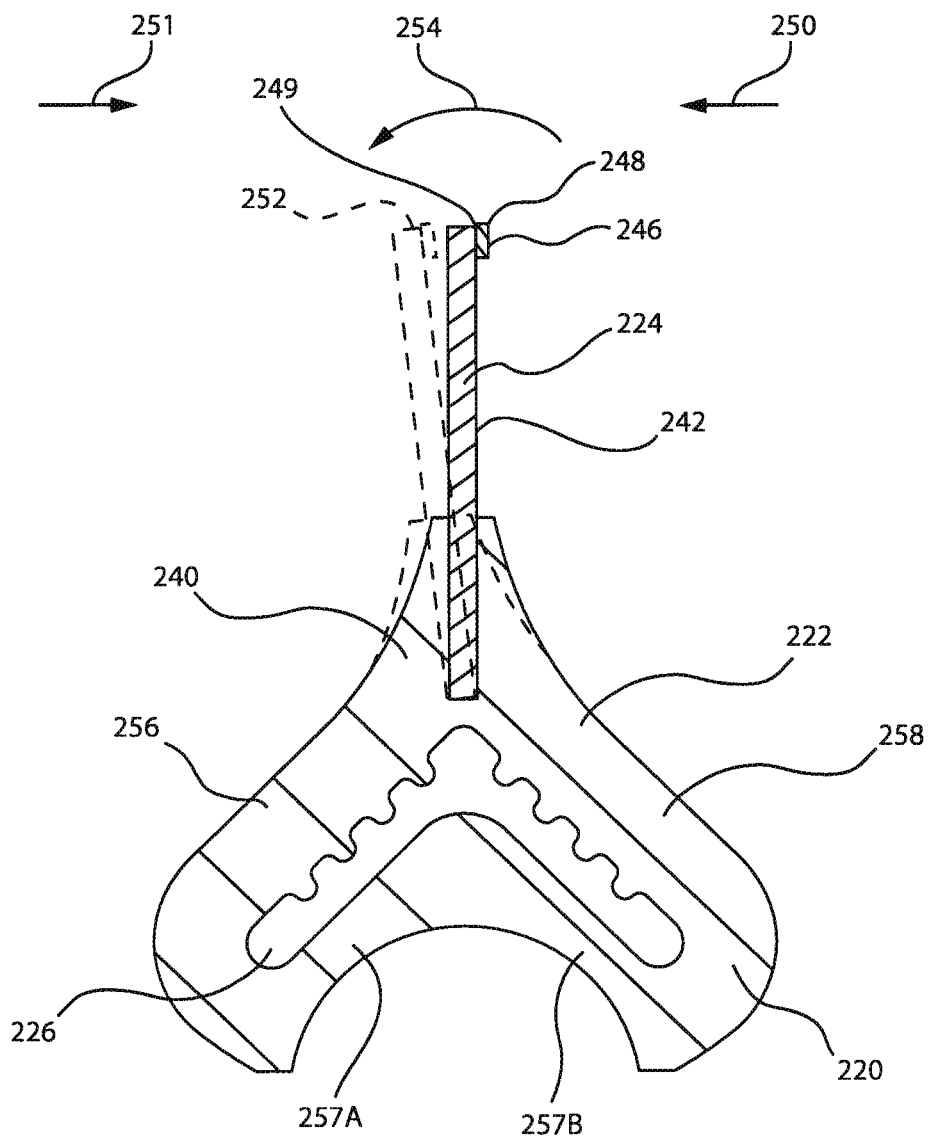
FIG. 11 is a cross-sectional view taken across line 11-11 in FIG. 10 showing a deflected position of the insert in dashed lines.

With reference to FIGS. 10 and 11, the blade 220 is shown in greater detail. The blade body 222 has an upper insert support portion 240 and the insert 224 has a plate 242 anchored in the insert support portion 240. The insert 224 further includes a scraping tip 246 secured to one side surface of the plate 242 at the upper end thereof with the tip 246 having a scraping edge 248. In one form, the tip 246 may be recessed into the face of the insert plate 242. As can be seen in FIG. 11, the scraping tip 246 may extend beyond an upper edge 249 of the plate 242.

In one approach, the blade 220 includes a mold lock 225 for anchoring the insert 224 in the body 222. For example, the plate 242 may have through openings 244 formed therein and the insert 224 is molded in situ with the body 222. The molded sections of the body 222 extending through the openings 244 of the plate 242 resist separation of the plate 242 from the body 222. The plate 242 may be sandblasted and sprayed with adhesive prior to being molded in situ with the body 222 in order to increase the strength of the connection between the plate 242 and the body 222. Rather than using through openings 244 in the plate 242, the plate 242 and body 222 may be connected using other approaches, such as only using an adhesive.

As shown in FIG. 11, the scraping tip 246 and edge 248 thereof are configured to scrape a conveyor belt traveling in direction 250. Lateral loads from the conveyor belt 213, such as a splice of the conveyor belt 212 impacting the edge 248, may deflect the insert 224 and cause the insert 224 to pivot in direction 254 to position 252. Pivoting of the insert 224 in direction 254 may place a leg 256 and a base section 257A of the body 222 in compression against the angle bar 230 and the pole 206 and cause tensile loading in an opposite leg 258 and base section 257B of the body 222. Like the blade body 146, the blade body 222 may be resilient and returns the insert 224 back to an upright, scraping engagement with the conveyor 212 after the splice travels downstream past the edge 248. Also like the body 146, the blade body 222 is generally symmetrical about a central vertical axis (extending through the peak of the inverted V-slot in FIG. 11) and resiliently urges the insert 224 back toward the undeflected position thereof whether the insert 224 has been deflected in direction 250 or direction 251. Thus, although the scraping tip 248 is oriented to scrape the belt 212 with movement of the belt in direction 250, the blade body 222 resiliently urges the insert 224 back toward its undeflected position and the edge 248 back into engagement with the belt 212 if the conveyor belt 212 operates in an opposite direction 251 such as due to roll-back of the conveyor belt 212 after the conveyor belt 212 has been turned off.

By using the insert 224, the materials of the insert 224 may be selected to have different properties than the materials of the body 222. For example, the plate 242 may be made of more rigid material, such as steel, while the body 222 is made of more resilient material such as rubber or urethane. Further, because the body 222 and the tip 246 are made of different materials, the mechanical properties of the material of the body 222 such as durometer, shear strength, and tensile strength may be selected for a particular application to provide a particular stiffness of the blade 220 without affecting the durability of the tip 246. Thus, the properties of the body 222 and insert 224 may independently be optimized for a particular application.

Figure 12:
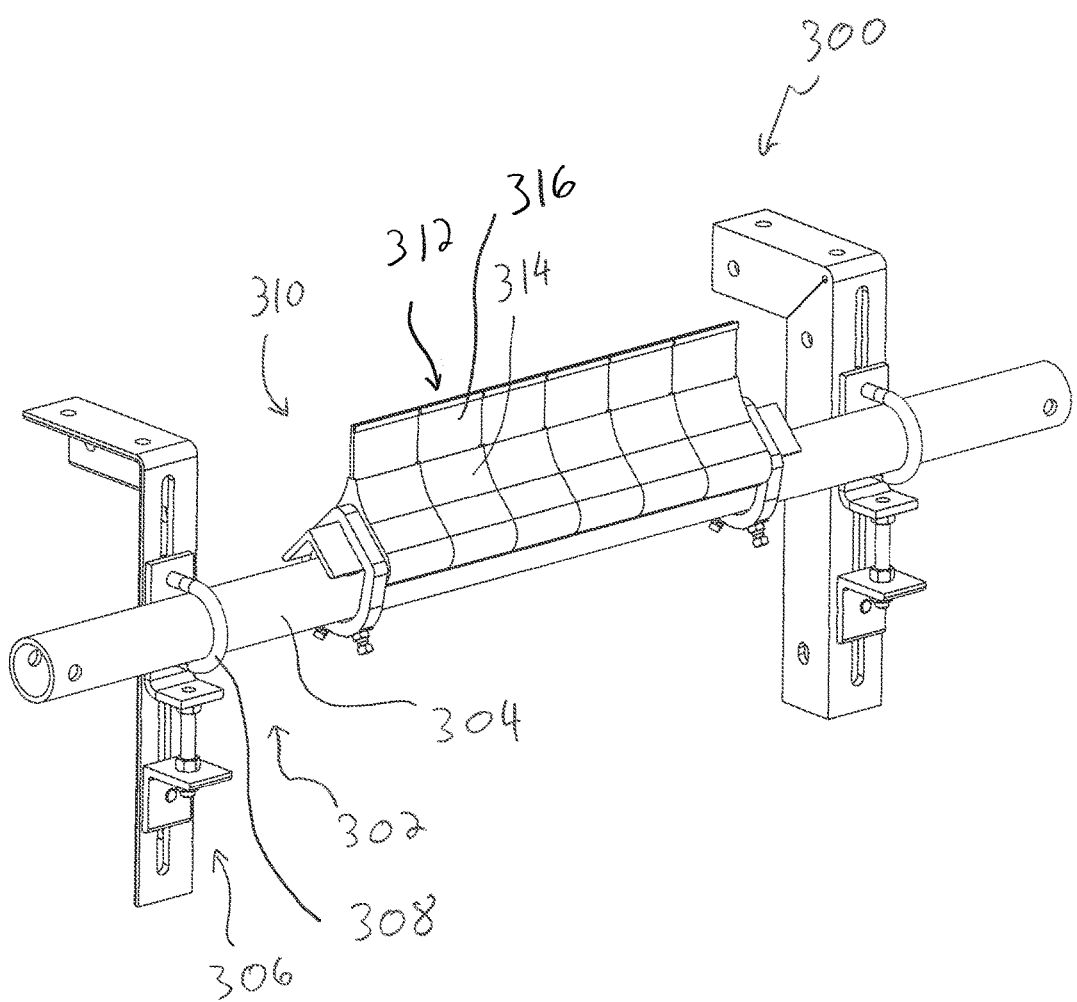
FIG. 12 is a perspective view of another conveyor belt cleaner having a removable cleaner assembly including scraper blades with resilient bodies and rigid inserts.
Figure 13:
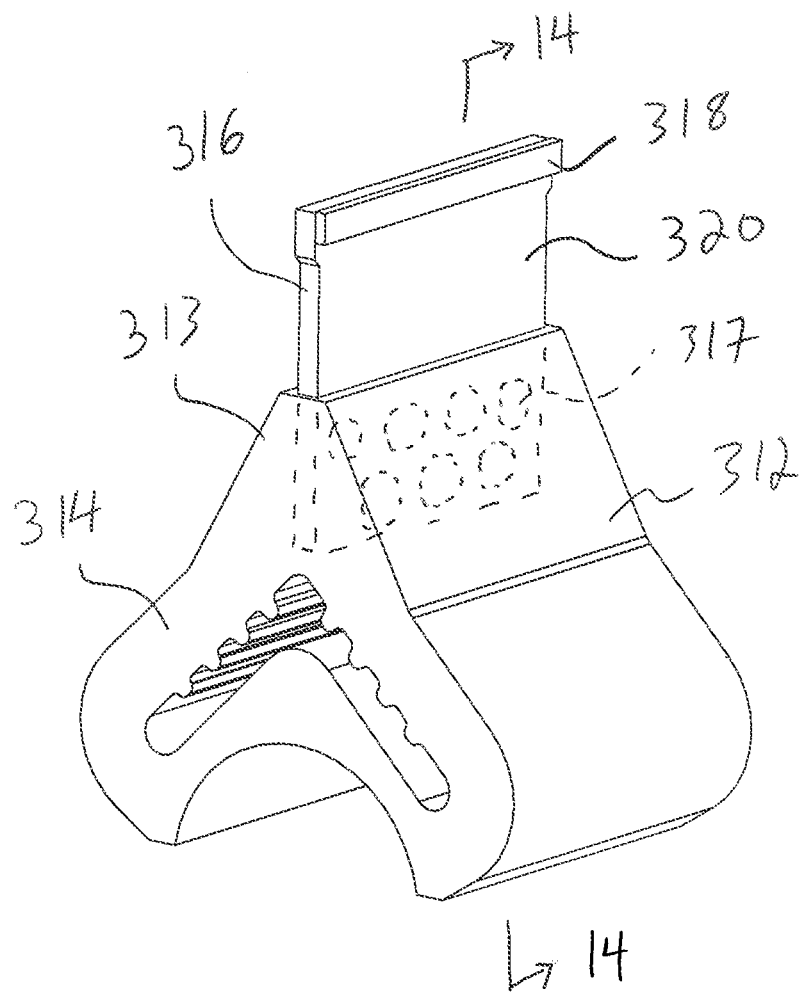
FIG. 13 is a perspective view of one of the scraper blades of FIG. 12 showing the scraper blade body having a wider support portion at a lower end of the insert than the scraper blade body of FIG. 10.
Figure 14:
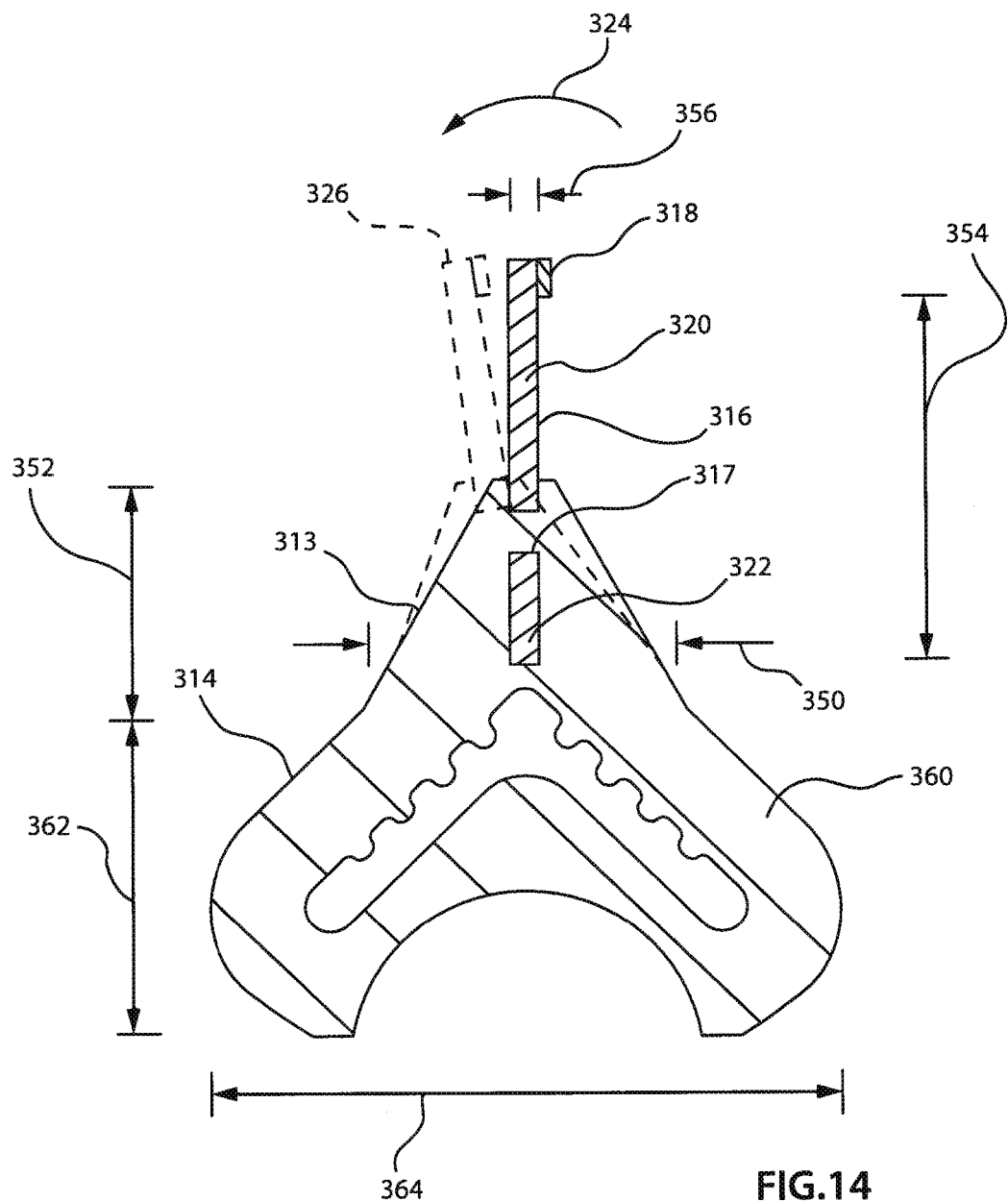
FIG. 14 is a cross-sectional view taken across line 14-14 in FIG. 13 showing a deflected position of the insert.

With reference to FIGS. 12-14, another conveyor belt cleaner 300 is shown that is similar in many respects to the conveyor belt cleaners 10, 200 discussed above such that generally only differences will be highlighted. One difference is that the belt cleaner 300 includes a support assembly 302 having a pole 304 connected to a rigid mount 306 with a u-bolt 308 that secures the pole 304 to the mount 306. Like the mount 210, the mount 306 generally does not permit vertical movement of the pole 304 during operation of the conveyor belt. The mount 306 may also be simpler to install and maintain than the resilient mount 40 (see FIG. 1) because the mount 306 has fewer components and lacks moving parts that could be damaged during conveyor belt operation.

Another difference is that the conveyor belt cleaner 300 includes a removable cleaner assembly 310 with blades 312 having a different insert support portion 313 (see FIG. 13) than the blades 220. More specifically, with reference to FIGS. 13 and 14, each blade 312 has a body 314 that includes the insert support portion 313 and an insert 316 secured to the body 314 by the insert support portion 313. The insert 316 has through openings 317 for being molded with the blade body 314, a tip 318, and a plate 320 connecting the tip 318 to the blade body 314. As shown in FIG. 14, the blade body insert support portion 313 is wider than the insert support portion 240 of the blade 220 (see FIG. 11). The wider insert support portion 313 positions more material around a base 322 of the insert plate 320 to make the insert support portion 313 stiffer and provide more resistance to deflection of the insert 316 in direction 324 toward position 326, as shown in FIG. 14.

With reference to FIG. 14, the insert support portion 313 of the blade body 314 has a tapered shape configured to position a sufficient amount of body material about the insert 316 to provide a desired amount of stiffness to resist deflection of the insert 316. For example, the lower end of the insert support portion 313 may have a width 350 in the range of approximately 1.6 inches to approximately 2.2 inches, such as approximately 1.9 inches. The insert support portion 313 may have a height 352 in the range of approximately 0.6 inches to approximately 2 inches, such as approximately 1.3 inches. The plate 320 of the insert 316 has an overall height 354 in the range of approximately 2.25 inches to approximately 3.4 inches, such as approximately 2.78 inches; and a width 356 in the range of approximately 0.125 inches to approximately 0.375 inches, such as approximately 0.17 inches. As another example and with reference to a similar scraper blade 606 in FIG. 22, the dimensions 350, 352, 354, and 356 for the scraper blade 606 may be a dimension 350 of approximately 2.7 inches, a dimension 352 of approximately 1.7 inches, a dimension 354 of approximately 3.34 inches, and a dimension 356 of approximately 0.25 inches.

Turning to the lower end of the blade body 314, the blade body 314 has a lower mounting portion 360 with a height 362 measured between the insert support portion 313 and the lower end of the blade body 314 in the range of approximately 2 inches to approximately 3 inches, such as approximately 2.26 inches. The lower mounting portion 360 also has an outermost width 364 in the range of approximately 4 inches to approximately 5.5 inches, such as approximately 4.2 inches. As another example, the dimensions 362 and 364 of the scraper blade 606 may be a dimension 362 of approximately 2.7 inches and a dimension 364 of approximately 5.2 inches.

Figure 15:
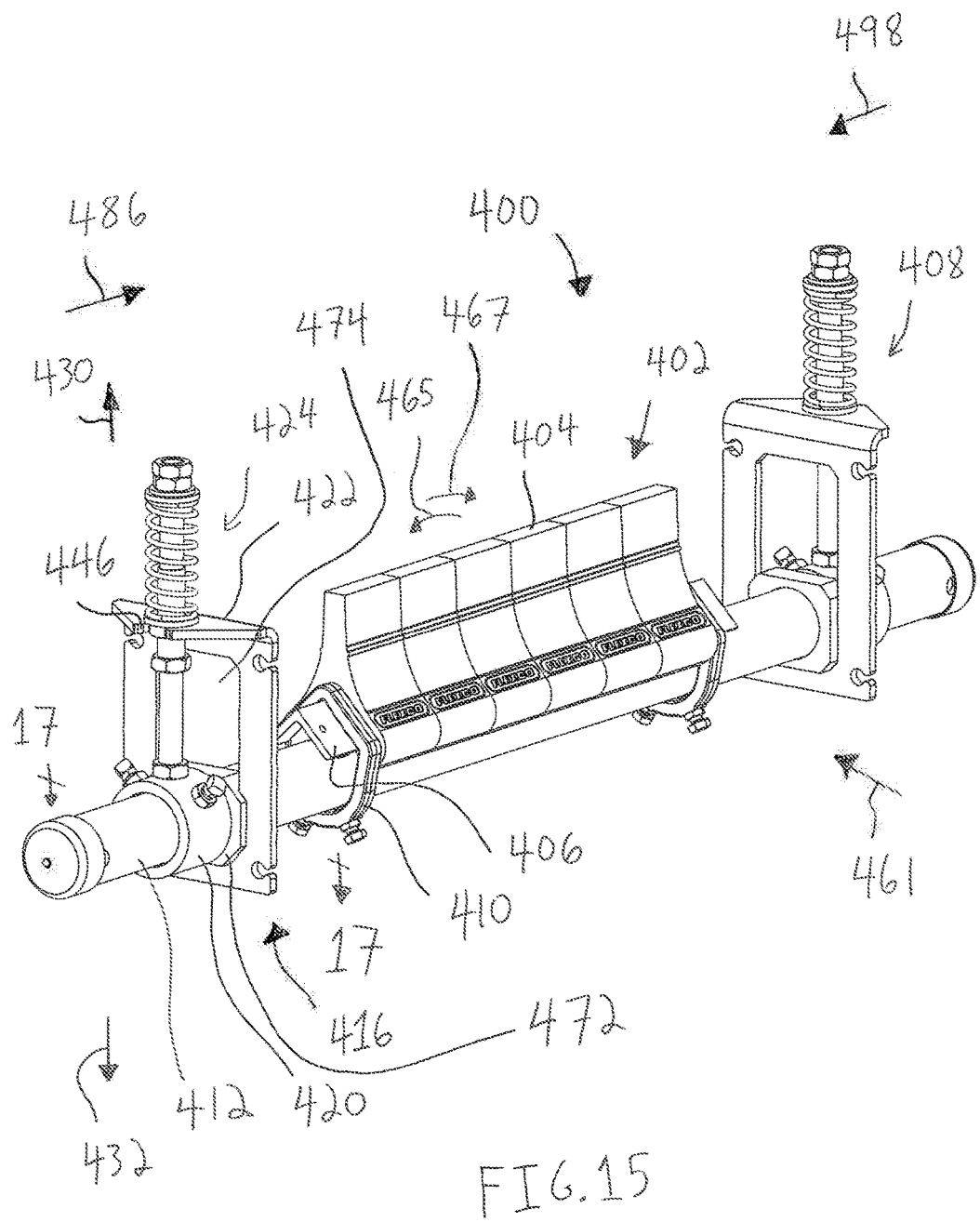
FIG. 15 is a perspective view of another conveyor belt cleaner having a removable cleaner assembly and a support assembly including resilient mounts.
Figure 16:
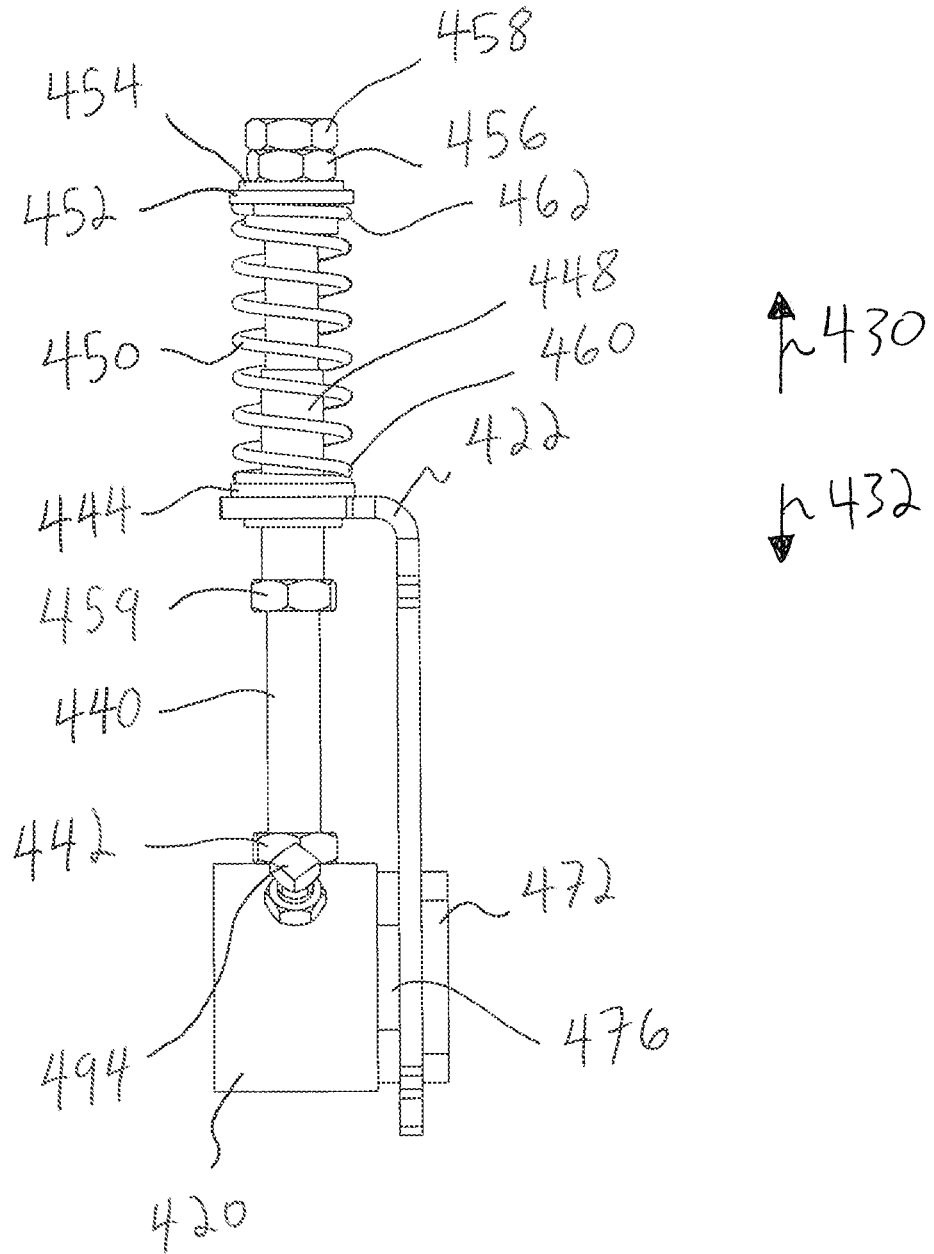
FIG. 16 is an elevational view of one of the resilient mounts of the conveyor belt cleaner of FIG. 15 showing a bracket of the mount and a spring-biased rod of the mount that can shift up and down relative to the bracket.
Figure 17:
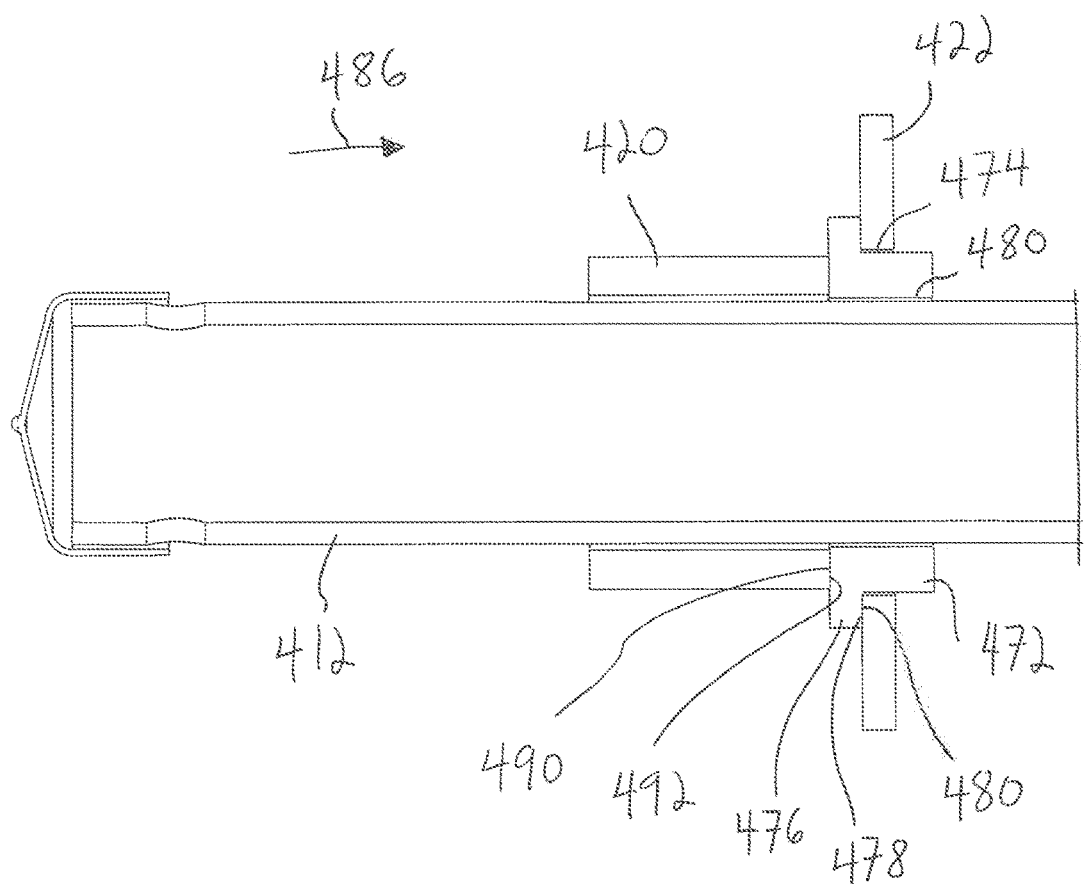
FIG. 17 is a cross-sectional view taken across line 17-17 in FIG. 15 showing a collar and a guide plate of the mount that receive a pole of the support assembly and control movement of the pole.

With reference to FIGS. 15-17, a conveyor belt cleaner 400 is provided having a removable cleaner assembly 402 that includes one or more scraper blades 404 mounted to an angle bar 406. The conveyor belt cleaner 400 includes a support assembly 408 to which the cleaner assembly 402 may be releasably secured via clamps 410 that clamp the angle bar 406 against seats of a pole 412 of the support assembly 408. The support assembly 408 further includes resilient mounts 416 that support the pole 412 and are configured to urge the pole 412, and scraper blades 404 thereon, toward a conveyor belt in direction 430 with a desired tensioning force. The resilient mounts 416 also permit the pole 412 to shift in direction 432 away from the conveyor belt in response to vertical loading on the scraper blades 404, such as from splices of the conveyor belt contacting the scraper blades 404. The scraper blades 404, angle bar 406, and clamps 410 are similar in many respects to the associated blade 16, angle bar 18, and clamps 72 of the conveyor belt cleaner 10 discussed above.

With reference to FIGS. 15 and 16, each resilient mount 416 includes a bracket 422 for being connected to a frame of the conveyor belt or other nearby structure. The bracket 422 has an elongated opening 474 through which the pole 412 extends and a collar 420 that receives an end of the pole 412. The collar 420 has set screws 494 that are tightened once the pole 412 has been advanced into the collar 420 to fix the pole 412 within the collar. The engagement of the set screws 494 resists turning of the pole 412 within the collar 420 and shifting of the pole 412 in directions 486, 498 within the collar 420.

Each resilient mount 416 has a biasing assembly 424 that urges the collar 420 in direction 430 relative to the bracket 422 while permitting the collar 420 to shift in direction 432 in response to impacts against the scraper blades 404. The biasing assembly 424 includes a rod 440 having outer threads along its entire length. The rod 440 a lower end threadingly engaged in an opening in the collar 420 and a jam nut 442 resists disengagement of the rod 440 from the collar 420.

The biasing assembly 424 includes a plastic bushing 444 received in an opening 446 of the bracket 442 and a metal sleeve 448 having inner threads engaged with the outer threads of the rod 440 and a smooth, cylindrical outer surface. The metal sleeve 448 may be turned to shift the metal sleeve 448 relative to the rod 440 due to the threaded engagement therebetween. The plastic bushing 444 has a through opening sized larger than an outer diameter of the metal sleeve 448 so that the metal sleeve 448 and rod 440 therein can extend through the opening of the plastic bushing 444 and shift in directions 430, 432 within the through opening of the plastic bushing 444 during operation of the conveyor belt. The plastic bushing 444 may be made of, for example, ultra-high-molecular-weight polyethylene or another material that permits smooth sliding movement of the metal sleeve 448 relative to the plastic bushing 444. The rod 440 and metal sleeve 448 may be made of, for example, steel.

With reference to FIG. 16, the biasing assembly 424 further includes a spring 450, plastic bushing 452, metal washer 454, positioning nut 456, and jam nut 458. The spring 450 has a lower end 460 seated on the bushing 444 mounted in the recess 446 of the bracket 422 and an upper end 462 contacting the underside of the bushing 452. The spring 450 resiliently urges the collar 420 in direction 430 as discussed below.

To apply a desired amount of tension on the scraper blades 404, the conveyor belt cleaner 400 is first installed near a conveyor belt so that the scraper blades 404 extend across the conveyor belt at the desired position on the conveyor belt, such as a downstream of a head pulley of the conveyor belt. With reference to FIG. 16, the weight of the pole 412, cleaner assembly 402, etc. tends to pull the rod 440 downward in direction 432 and draws the positioning nut 456 against the metal washer 454 and plastic bushing 452. The spring 450, however, resists movement of the plastic bushing 452 in direction 432 which would compress the spring 450. The spring 450 thereby supports the plastic bushing 452, metal washer 452, and positioning nut 456 at an initial vertical position during an initial stage of the tensioning operation.

Next, the jam nut 458 is shifted upward away from the positioning nut 456 or removed from the rod 440 and the positioning nut 456 is turned in a first direction to tension the scraper blades 404 against the conveyor belt. Because the spring 450 supports the positioning nut 456 at the initial vertical position, turning the positioning nut 456 in the first direction shifts the rod 440 and collar 420 connected thereto in direction 430 and brings the scraper blades 404 into contact with the conveyor belt.

Once the scraper blades 404 have been brought into contact with the belt, the installer continues to turn the positioning nut 456 in the first direction to apply a tensioning load to the spring 450. Specifically, the scraper blades 404 have a high strength in the vertical 430, 432 directions such that turning the positioning nut 456 generally does not shift the rod 440 upward in direction 430 any farther. Instead, continued turning of the positioning nut 456 in the first direction causes the positioning nut 456 to shift in direction 432 along the rod 440 which, in turn, shifts the metal washer 454 and plastic bushing 452 toward the plastic bushing 444. Shifting the plastic bushing 452 toward the plastic bushing 444 compresses the spring 450 and causes the spring 450 to apply a resilient force in direction 430 corresponding to the deflection of the spring 450 and the spring constant of the spring 450. The installer continues to turn the positioning nut 456 until a desired amount of tensioning force is applied to the scraper blades 404 contacting the conveyor belt, which can be determined by the measured compression of the spring 450 and the known spring constant of the spring 450.

Once the resilient mounts 416 have been set to tension the scraper blades 404 against the conveyor belt with a desired amount of force, the jam nut 458 is turned in the first direction to shift the jam nut 458 along the rod 440 in direction 432 until the jam nut 458 engages the positioning nut 456. The engagement of the jam nut 458 against the positioning nut 456 resists rotation of the positioning nut 456 in a reverse, second direction and associated movement of the rod 440.

Further, a lower jam nut 459 is threadingly engaged on the rod 440 and is initially spaced below a lower end of the bushing 444, as shown in FIG. 16. Once the desired tension has been applied to the scraper blades 404, the lower jam nut 459 is turned to shift the lower jam nut 459 in direction 430 until the lower jam nut 459 engages the lower end of the metal sleeve 448. The lower jam nut 459 fixes the metal sleeve 448 in position along the rod 440 so that the metal sleeve 448 can support the rod 440 within the plastic bushing 444.

Each resilient mount 416 also includes a guide plate 472 positioned partially in the opening 474 of the bracket 422 that separates the collar 420 from the bracket 422. As shown in FIG. 17, the guide plate 472 has an opening 480 that receives the pole 412 such that both the collar 420 and guide plate 472 extend around the pole 412 and travel in directions 430, 432 with corresponding movement of the pole 412. As the pole 412 shifts in directions 430, 432, the guide plate 472 slides along the opening 474. In one form, the collar 420 and bracket 422 are made of a metal, such as steel, and the bracket 422 is made of a plastic such that the guide plate 472 operates as a bearing for the collar 420 to shift smoothly along the bracket 422.

With reference to FIG. 17, the guide plate 472 has outer flanges 476 with inner surfaces 478 that contact and slide against outer surfaces 480 of the bracket 422. Conveyor belt loading may urge the scraper blades 404, and pole 412 connected thereto, in direction 486. As noted above, the collar 420 is fixed to the pole 412 via set screws 494. Any movement of the pole 412 in direction 486 causes an end surface 490 of the collar 420 to abut a surface 492 of the guide plate 476 which, in turn, causes the guide plate inner surface 478 to press against the bracket outer surface 480. This produces a stack up of the collar 420, guide plate 472 and bracket 422 which resists any further movement of the pole 412 in direction 486. The resilient mount 416 at the opposite end of the pole 412 can similarly resist movement of the pole 412 in an opposite direction 498 such that, together, the resilient mounts 416 provide a durable construct against loading in the 486, 498 directions.

Figure 18:
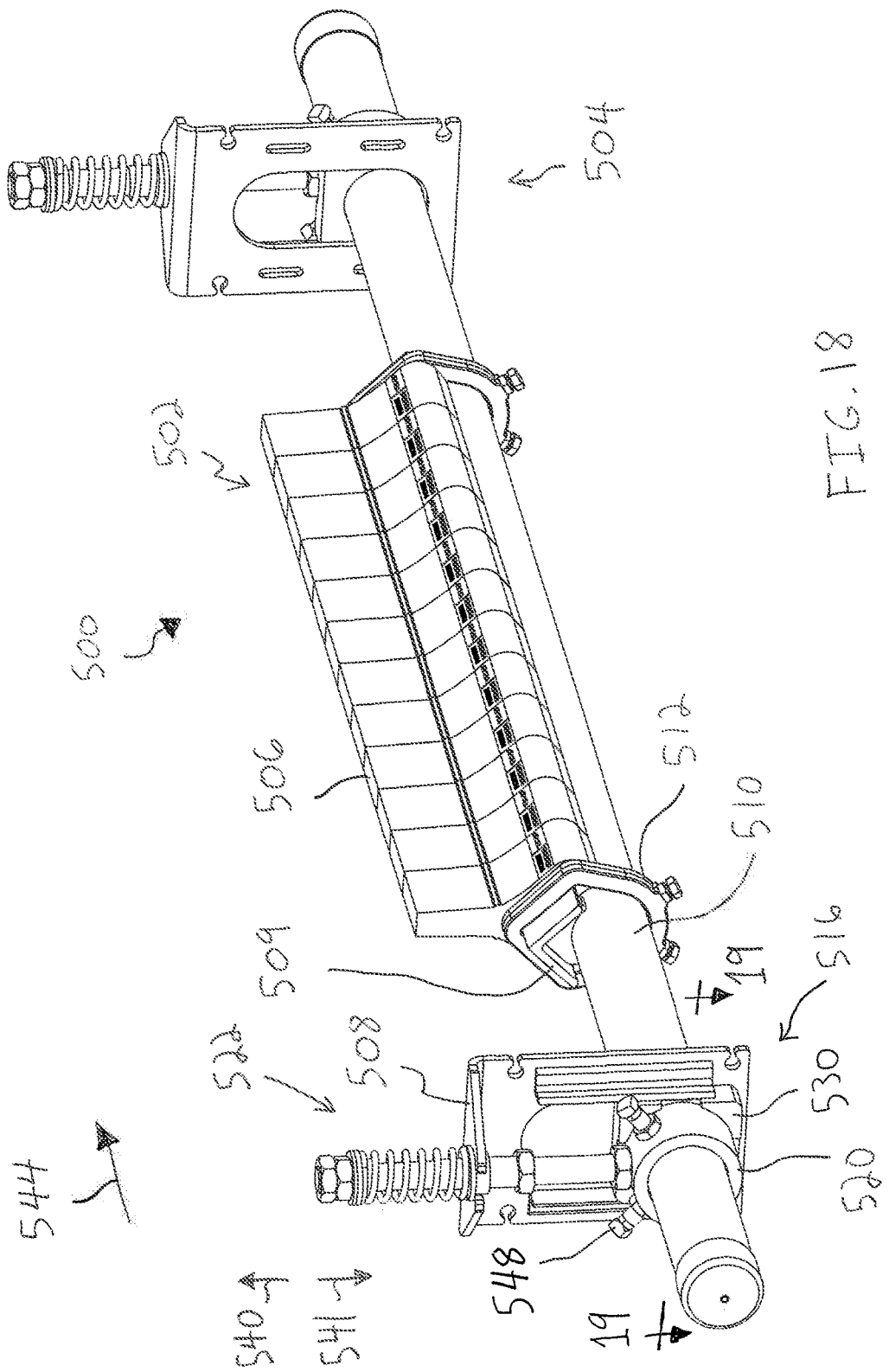
FIG. 18 is a perspective view of another conveyor belt cleaner having a removable cleaner assembly and a support assembly that includes a resilient mounts.
Figure 19:
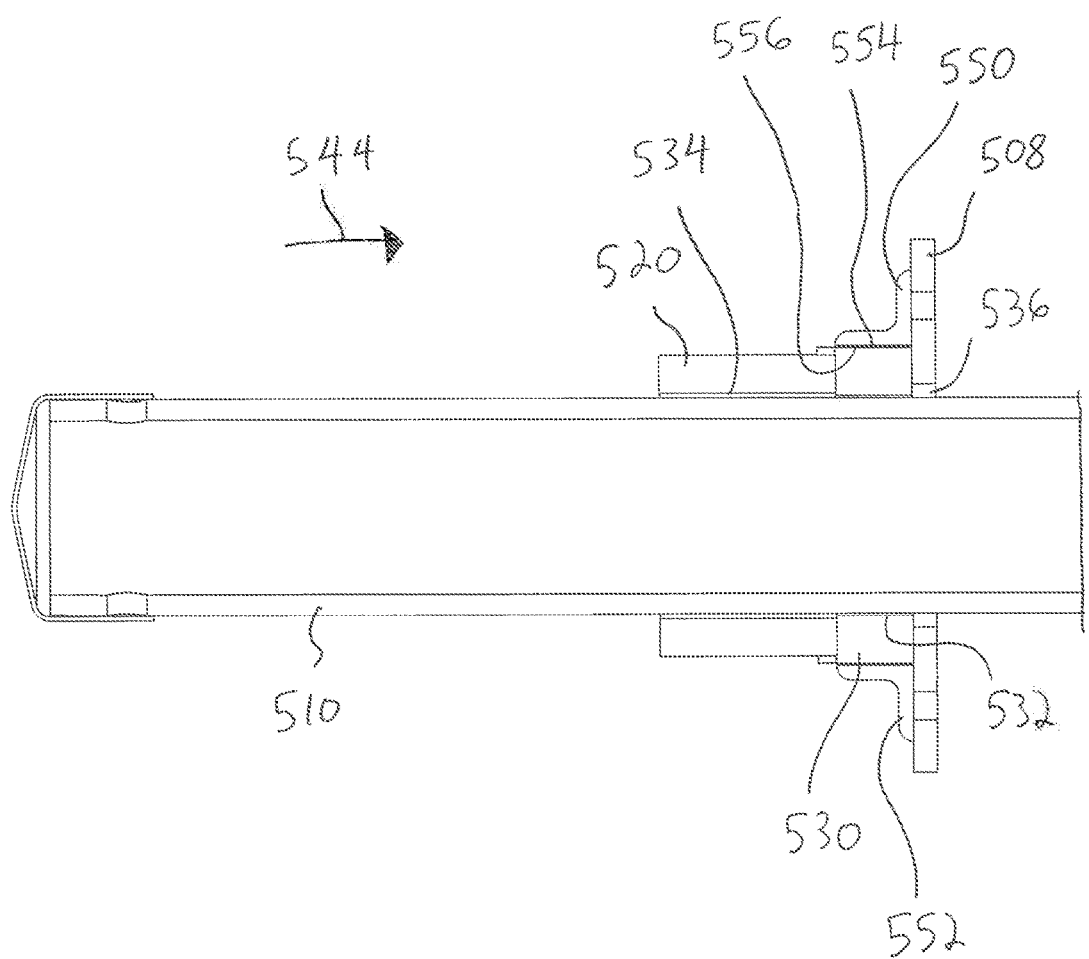
FIG. 19 is a cross-sectional view taken across line 19-19 in FIG. 18 showing a collar of one of the resilient mounts receiving a pole of the support assembly and a guide assembly of the mount that includes a guide plate and a pair of guide angles that control movement of the collar and pole.
Figure 20:
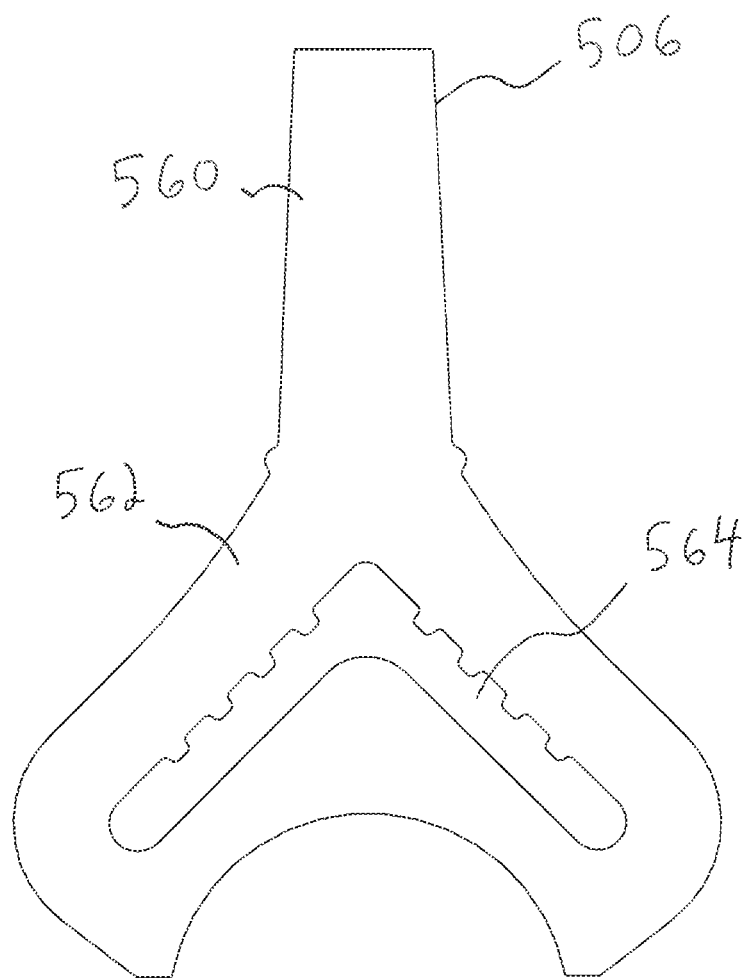
FIG. 20 is an elevational view of one of the scraper blades of the conveyor belt cleaner of FIG. 18 showing a through opening for receiving an angle bar of the cleaner assembly.
Figure 21:
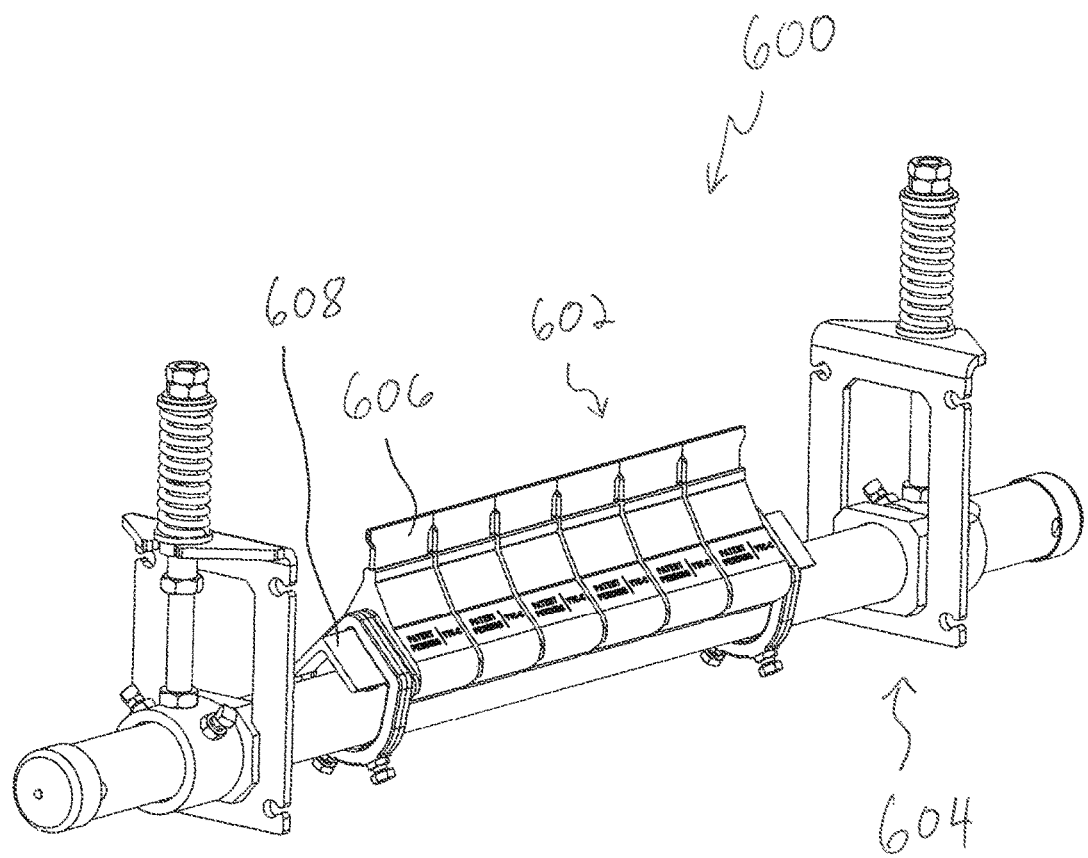
FIG. 21 is a perspective view of another conveyor belt cleaner having a removable cleaner assembly and a support assembly with resilient mounts.

With reference to FIGS. 18-20, a conveyor belt cleaner 500 is provided having a removable cleaner assembly 502 and a support assembly 504. The removable cleaner assembly 502 includes one or more scraper blades 506 mounted to an angle bar 508 that can be secured to a pole 510 of the support assembly 504 via clamps 512. The support assembly 504 includes resilient mounts 516 that are similar in many respects to the resilient mounts 416 discussed above.

Each resilient mount 516 has a collar 520 for receiving an end portion of the pole 510 and a bias assembly 522 for tensioning the scraper blades 506 against a conveyor belt. The collar 520 is fixed to the pole by set screws 546, 548 that resist relative movement of the pole 510 and collar 520. The resilient mount 516 has a guide plate 530 with a through opening 532 that receives the pole 510 and is aligned with an opening 534 of the collar 520 when both the guide plate 530 and the collar 520 extend about the pole 510. The bracket 508 has an elongated opening 536 which permits the pole 510 to move in directions 540, 541. With reference to FIG. 19, the guide plate 530 does not extend into the opening 536.

When the scraper blades 506 are subject to loading which urges the pole 510 in direction 544, the collar 520 tends to move in direction 544 with the pole 510. This causes the collar 510 to abut against the guide plate 530 which, in turn, abuts against the bracket 508. The stack up of the collar 520, guide plate 530, and bracket 508 resists movement of the pole 510 in direction 544. The resilient mount 516 includes a pair of guide angles 550, 552 welded, fastened, or otherwise attached to the bracket 508 with inner surfaces 554 that abut outer sides 556 of the guide plate 530 and limit the guide plate 530 to movement in directions 540, 541.

With reference to FIG. 20, each scraper blade 506 is similar to the scraper blades 16 discussed above including a scraping portion 560 and a body portion 562. The body portion 562 has additional material and less of a curved transition to the scraping portion 560 than the body 146 of the scraper blade 16 which results in a more rigid scraper blade 506. The scraper blade body portion 562 includes a through opening 564 sized to receive an angle bar 509 of the cleaner assembly 502. The angle bar 509 may be commercially available 5/16 inch angle steel with dimensions of 2.5 inches by 2.5 inches.

With reference to FIGS. 21-25, another conveyor belt cleaner 600 is shown including a removable cleaner assembly 602 and a support assembly 604. The support assembly 604 is substantially similar to the support assembly 408 discussed above. The removable cleaner assembly 602 includes scraper blades 606 mounted to an angle bar 608.

Figure 22:
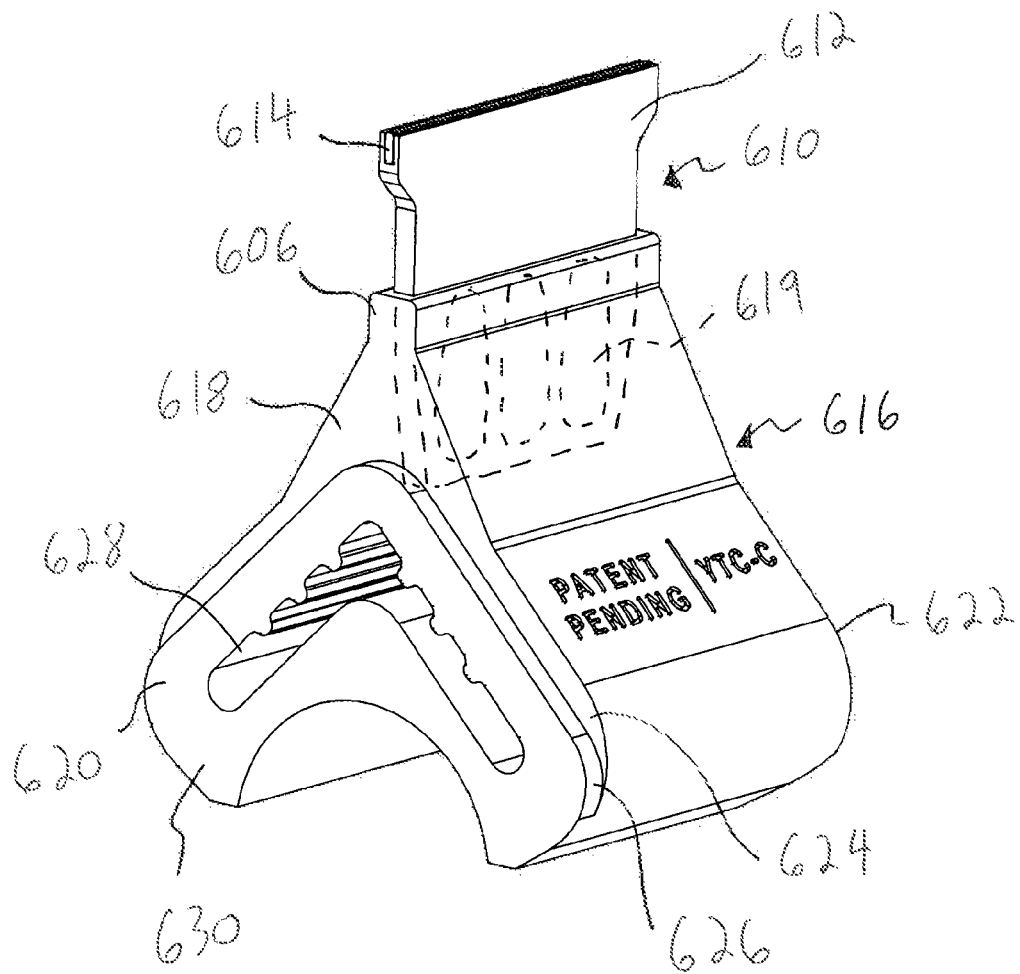
FIG. 22 is a perspective view of one of the scraper blades of the conveyor belt cleaner of FIG. 21 showing a rigid insert and a resilient body of the scraper blade with a projection on one side of the resilient body.

With reference to FIG. 22, each scraper blade 606 includes an insert 610 having a rigid plate 612 and a scraping tip 614 at an upper end thereof. The scraper blade 606 has a resilient body 616 with an insert support portion 618. The body 616 includes a pair of outer sides 620, 622 and a through opening 628 extending from one side 620 to the other side 622 that is sized to receive the angle bar 608. Like the body 222, the body 616 has a uniform cross section for substantially its entire width between the sides 620, 622.

Figure 23:
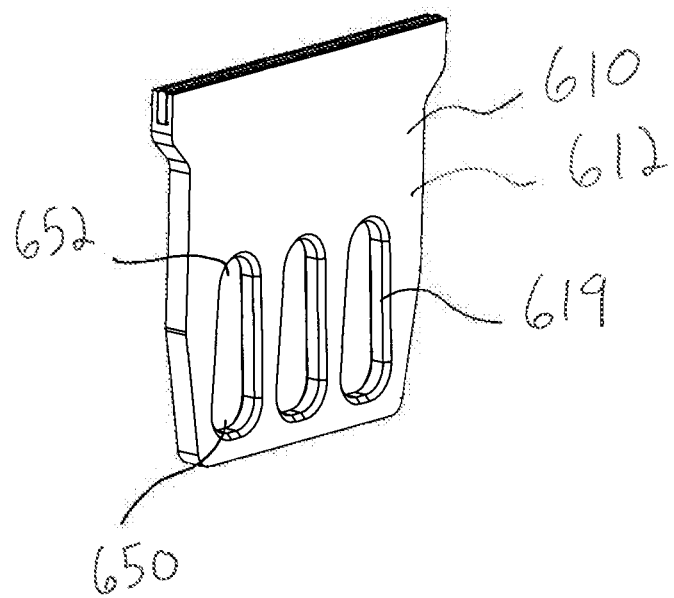
FIG. 23 is a perspective view of the insert of FIG. 22 showing through openings of a plate of the insert through which material of the resilient body extends.

In one approach, the body 616 is molded in situ with the insert 610 to secure the insert 610 and body 616 together. The plate 612 has through openings 619 that permit material of the body 616 to flow into the openings 619 during molding of the body 616 onto the plate 612. Once the material of the body 616 has hardened, the portions of the body 616 extending through the plate openings 619 resist pullout of the plate 612 from the body 616. With reference to FIG. 23, the openings 619 of the plate 612 have a wider end 650 with more body material extending therethrough and a narrow end 652 with less body material extending therethrough. The larger amount of body material extending through the wider end 650 minimizes stress concentrations in the body material due to loading on the plate 612 that attempts to pull the plate 612 out of the body 616. The narrow end 652 of each opening 619 minimizes the stress in the plate 612 due to bending forces acting on the plate 612.

Figure 24:
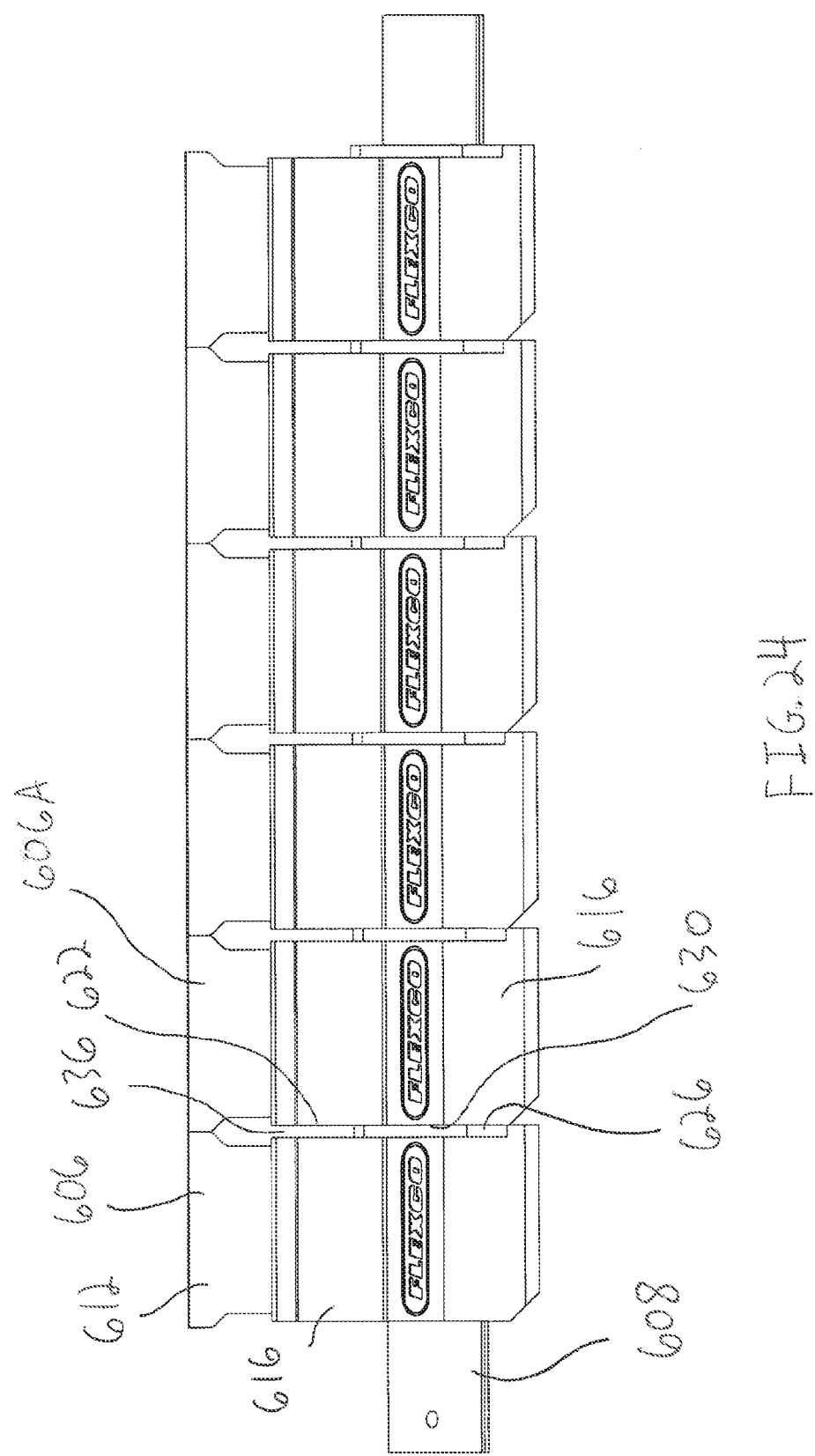
FIG. 24 is an elevational view of the cleaner assembly of FIG. 21 showing the scraper blades mounted on an angle bar of the cleaner assembly and projections of the scraper blade bodies creating gaps between the scraper blades.

Returning to FIG. 22, one side 620 of the body 616 has a notched profile 624 that defines a projection 626 of the body 616. The projection 626 has a side surface 630 for abutting the side 622 of a nearby scraper blade 606. With reference to FIG. 24, the scraper blade 606 is shown mounted on the angle bar 608 next to scraper blade 606A. The projection 626 forms a gap 636 once the side surface 630 of the scraper blade 606 has been shifted into contact with the side 622 of the scraper blade 606A. This gap 636 permits relative movement of the insert support portion 618 of the scraper blade 606 relative to the insert support portion 618 of the nearby scraper blade 606A. This relative movement permits the inserts 612 to move more freely and independently of each other because the associated insert support portion 618 is in clearance with the insert support portions 618 of nearby scraper blades 606.

Figure 25:
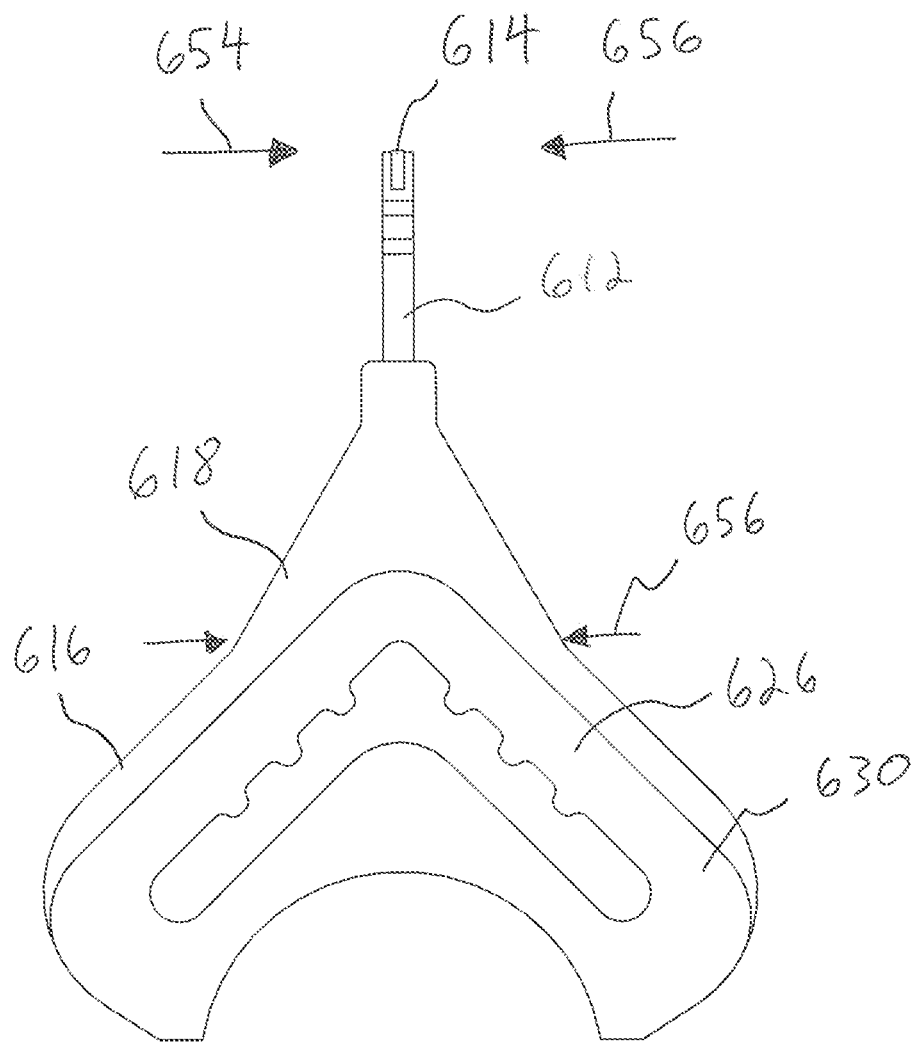
FIG. 25 is an elevational view of the scraper blade of FIG. 22 showing a through opening of the body for receiving the angle bar of the cleaner assembly.

With reference to FIG. 25, the scraping tip 614 is mounted at a middle position of the plate 612 to permit the scraping tip 614 to scrape a conveyor belt when the conveyor belt is moving in direction 654 or 656. The insert support portion 618 of the body 616 tapers outwardly to a width 656 at a lower end of the support portion 618 configured to provide a wide base for the support portion 618 to resist deflection of the plate 612 during operation of the scraper blade 606.

Figure 26:
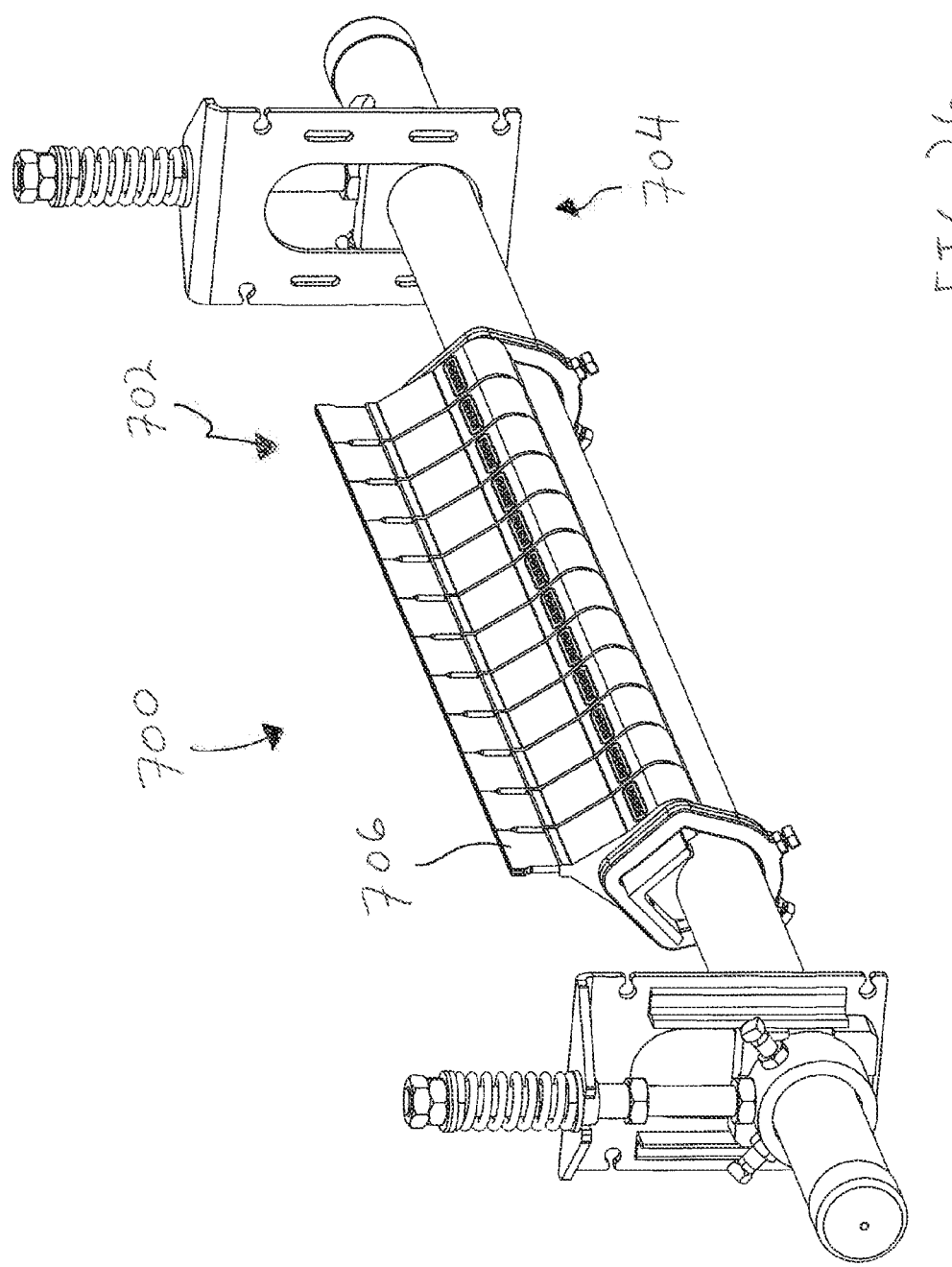
FIG. 26 is a perspective view of another conveyor belt cleaner having a removable cleaner assembly and a support assembly including resilient mounts.
Figure 27:
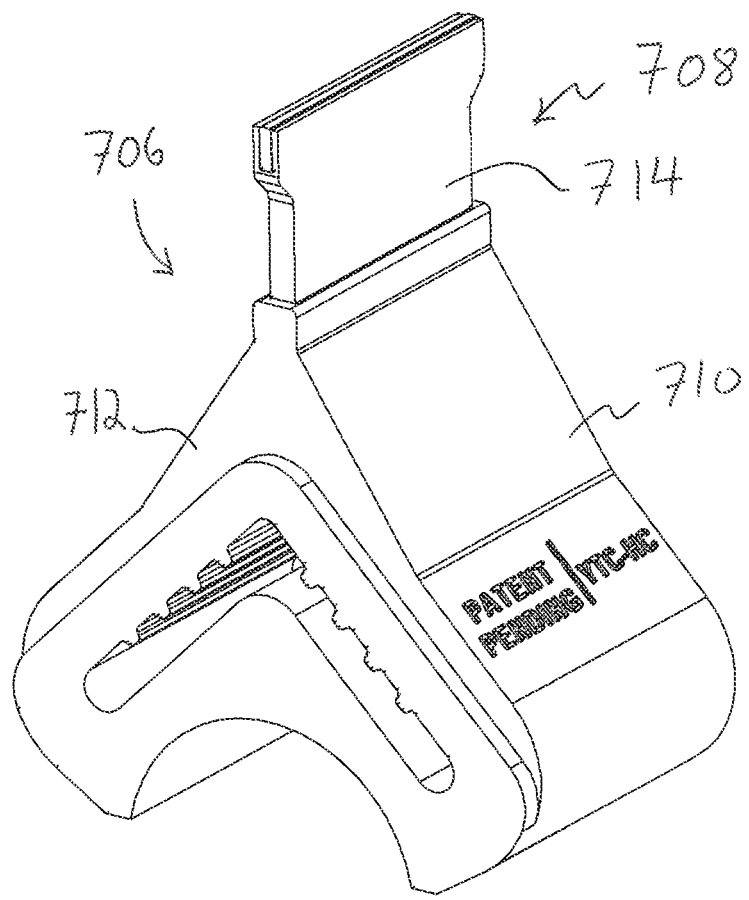
FIG. 27 is a perspective view of a scraper blade of the conveyor belt cleaner of FIG. 26 showing a rigid insert and a resilient body of the scraper blade with the resilient body having a projection on one side thereof.
Figure 28:
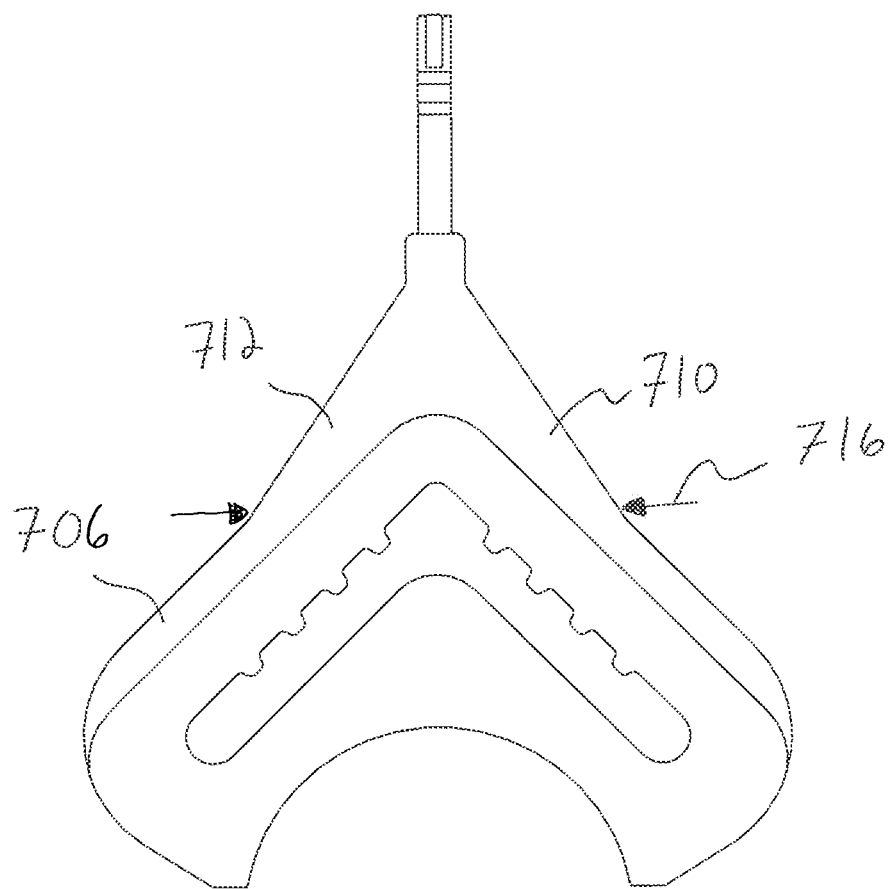
FIG. 28 is an elevational view of the scraper blade of FIG. 27 showing an upper insert support portion of the body having a width that is greater than a width of an insert support portion of the scraper blade of FIG. 25.

With reference to FIGS. 26-27, another conveyor belt cleaner 700 is provided having a removable cleaner assembly 702 and a support assembly 704. The support assembly 704 is similar in many respects to the support assembly 504 discussed above. The cleaner assembly 702 includes scraper blades 706 that are similar in many respects to the scraper blade 606 discussed above. The scraper blade 706 includes an insert 708 and a resilient body 710 with an insert support portion 712 in which a plate 714 of the insert 708 is mounted. With reference to FIG. 28, the resilient body 710 of a scraper blade 706 has additional material to provide greater rigidity than the scraper blade 606. For example, the insert support portion 712 may have a width 716 that is wider than the width 656 of the insert support portion 618 of the scraper blade 606. The wider insert support portion 712 provides additional rigidity against deflection of the plate 714, which may be desirable in some applications.

Those skilled in the art will recognize that a wide variety of modifications, alterations, and combinations can be made with respect to the above described embodiments without departing from the spirit and scope of the invention, and that such modifications, alterations, and combinations, are to be viewed as being within the scope of the invention.

What is claimed is:

1. A scraper blade for scraping material from a conveyor belt running in a downstream travel direction, the scraper blade comprising:
   an upper scraping portion;
   a resilient, lower body portion;
   a through opening extending through the lower body portion in a lateral direction transverse to the downstream travel direction for receiving a complimentary elongate mounting member therethrough;
   a pair of ends of the through opening spaced from each other in the downstream travel direction; and
   a non-linear configuration of the through opening as the through opening extends in the downstream travel direction from one end of the through opening to the other end,
   wherein the non-linear configuration of the through opening is elongated extending from one end of the through opening to the other end.

2. The scraper blade of claim 1 wherein the non-linear configuration of the through opening includes a pair of lower, generally straight portions extending away from an upper juncture of the generally straight portions.

3. The scraper blade of claim 1 wherein the lower body portion has a concave bottom surface for engaging a curved surface of a support and the ends of the through opening spaced from each other in the downstream travel direction are disposed at opposite sides of the concave bottom surface.

4. The scraper blade of claim 1 wherein the lower body portion includes a plurality of protrusions extending into the through opening for contacting the elongate mounting member received in the through opening.

5. The scraper blade of claim 1 wherein the lower body portion includes a base portion extending below the through opening for being secured between the elongate mounting member received in the through opening and a support assembly.

6. The scraper blade of claim 1 wherein the lower body portion includes a pair of opposite lateral sides and the through opening extends in the lateral direction transverse to the downstream travel direction to open at the opposite sides;
   the base portion including a pair of thinner portions and a thicker portion intermediate the thinner portions with the thinner and thicker portions extending between the opposite sides of the lower body portion.

7. The scraper blade of claim 1 wherein the lower body portion has opposite lateral sides and a dimension extending between the lateral sides in the lateral direction transverse to the downstream travel direction; and
   the lower body portion having a cross-section perpendicular to the dimension that is uniform for substantially the entire dimension of the lower body portion.

8. The scraper blade of claim 1 wherein the cross-sectional configuration of the through opening includes first and second generally straight portions that extend transverse to each other at an angle in the range of approximately sixty degrees to approximately one hundred and twenty degrees.

9. The scraper blade of claim 8 wherein the first and second generally straight portions extend transverse to each other at an angle of approximately ninety degrees.

10. The scraper blade of claim 1 in combination with the elongate mounting member, the elongate mounting member being made of metal and having a length and a non-linear cross-sectional configuration perpendicular to the length.

11. A scraper blade for being connected to a support assembly extending across a conveyor belt and scraping the conveyor belt as the conveyor belt travels in a downstream belt travel direction, the scraper blade comprising:
   an upper scraping portion;
   a resilient, lower body portion;
   leg portions of the resilient, lower body portion generally extending in upstream and downstream directions and including lower ends of the leg portions spaced apart from each other in the belt travel direction;
   a lower portion of the lower body portion connecting the leg portions; and
   a through opening having leg opening portions extending through corresponding ones of the leg portions of the lower body portion with the through opening extending about the lower portion and being sized to receive an elongate mounting member for securing the lower body portion to the support assembly.

12. The scraper blade of claim 11 wherein the upstream and downstream leg portions each include an upper section and a lower section that extend above and below the leg opening portion extending through the corresponding leg portion, and the lower portion of the resilient lower body portion connects the lower sections of the leg portions.

13. The scraper blade of claim 11 wherein the lower portion of the resilient lower body portion includes a thicker portion and thinner portions upstream and downstream from the thicker portion.

14. The scraper blade of claim 11 wherein the lower portion of the resilient lower body portion includes an upper surface with at least one flat surface portion extending along the through opening for facing the elongate mounting member received in the through opening and a concave lower surface for seating against the support assembly.

15. The scraper blade of claim 14 wherein the at least one flat surface portion includes a pair of flat surface portions extending transverse to each other for facing the elongate mounting member received in the through opening.

16. The scraper blade of claim 11 wherein the resilient lower body portion includes a plurality of protrusions extending into the through opening for contacting the elongate mounting member received in the through opening.

17. The scraper blade of claim 11 wherein the upper scraping portion is made of a resilient material and is integrally formed with the resilient lower body portion.

18. The scraper blade of claim 11 wherein the upper scraping portion comprises a rigid plate mounted to the resilient lower body portion.

19. A conveyor belt cleaner assembly for being secured to a support of a support assembly that extends across a conveyor belt transversely to a downstream travel direction, the support assembly including a securing mechanism for clamping the cleaner assembly to the support, the cleaner assembly comprising:
   an elongate mounting member for being clamped to the support by the securing mechanism;
   at least one scraper blade for being mounted to the elongate mounting member;
   a resilient, lower body portion of the at least one scraper blade having a through opening sized to receive the elongate mounting member extending therethrough for mounting the scraper blade to the elongate mounting member, the resilient, lower body portion being of a resilient material; and
   a base portion of the scraper blade lower body portion extending below the through opening and having an exposed, downwardly facing bottom surface thereof so that the base portion is held between the elongate mounting member and the support with the resilient material of the exposed, downwardly facing bottom surface of the base portion engaging against the support when the securing mechanism clamps the elongate mounting member to the support.

20. The cleaner assembly of claim 19 wherein the lower body portion includes a pair of lower ends spaced apart from each other in the belt travel direction and the base portion extends below the through opening between the spaced lower ends.

21. The cleaner assembly of claim 19 wherein the at least one scraper blade includes a plurality of scraper blades for being mounted to the elongate mounting member.

22. The cleaner assembly of claim 19 wherein the elongate mounting member includes a length and end portions spaced along the length from each other for being clamped by the securing mechanism; and
   the at least one scraper blade having a thickness along the elongate mounting member that is less than the elongate mounting member so that both of the end portions of the elongate mounting member extend out from the scraper blade through opening for being clamped by the securing mechanism.

23. A conveyor belt cleaner assembly for being secured to a support of a support assembly that extends across a conveyor belt transversely to a downstream travel direction, the support assembly including a securing mechanism for clamping the cleaner assembly to the support, the cleaner assembly comprising:
   an elongate mounting member for being clamped to the support by the securing mechanism;
   at least one scraper blade for being mounted to the elongate mounting member;
   a resilient, lower body portion of the at least one scraper blade having a through opening sized to receive the elongate mounting member extending therethrough for mounting the scraper blade to the elongate mounting member; and
   a base portion of the scraper blade lower body portion extending below the through opening so that the base portion is held between the elongate mounting member and the support with the securing mechanism clamping the elongate mounting member to the support,
   wherein the elongate mounting member has a length and a non-circular cross-section substantially perpendicular to the length and the through opening of the lower body portion has a non-circular shape complimentary to the non-circular cross-section of the elongate mounting member.

24. A conveyor belt cleaner assembly for being secured to a support of a support assembly that extends across a conveyor belt transversely to a downstream travel direction, the support assembly including a securing mechanism for clamping the cleaner assembly to the support, the cleaner assembly comprising:
   an elongate mounting member for being clamped to the support by the securing mechanism;
   at least one scraper blade for being mounted to the elongate mounting member;
   a resilient, lower body portion of the at least one scraper blade having a through opening sized to receive the elongate mounting member extending therethrough for mounting the scraper blade to the elongate mounting member; and a base portion of the scraper blade lower body portion extending below the through opening so that the base portion is held between the elongate mounting member and the support with the securing mechanism clamping the elongate mounting member to the support, wherein the elongate mounting member includes a pair of lower, flat surfaces extending transverse to each other and facing the base portion of the resilient body portion.

25. The cleaner assembly of claim 24 wherein the elongate mounting member includes a pair of upper, flat surfaces extending transverse to each other opposite the lower, flat surfaces.

26. A conveyor belt cleaner assembly for being secured to a support of a support assembly that extends across a conveyor belt transversely to a downstream travel direction, the support assembly including a securing mechanism for clamping the cleaner assembly to the support, the cleaner assembly comprising:

an elongate mounting member for being clamped to the support by the securing mechanism;

at least one scraper blade for being mounted to the elongate mounting member;

a resilient, lower body portion of the at least one scraper blade having a through opening sized to receive the elongate mounting member extending therethrough for mounting the scraper blade to the elongate mounting member; and a base portion of the scraper blade lower body portion extending below the through opening so that the base portion is held between the elongate mounting member and the support with the securing mechanism clamping the elongate mounting member to the support, wherein the elongate mounting member has a non-linear cross-sectional configuration including a pair of flanges extending transverse to each other and the scraper blade through opening includes a pair of portions of the opening each oriented to receive one of the flanges of the elongate mounting member.

27. A conveyor belt cleaner system comprising:
a support for extending across a conveyor belt;
a cleaner assembly for being positioned on the support, the cleaner assembly including an elongate mounting member and at least one scraper blade for being mounted on the elongate mounting member;
an upper scraping portion of the at least one scraper blade;
a resilient, lower body portion of the at least one scraper blade;
a through opening of the resilient lower body portion of the at least one scraper blade for receiving the elongate mounting member extending therethrough to mount the at least one scraper blade to the elongate mounting member; and
an exposed, downwardly facing bottom surface of the resilient lower body portion of the at least one scraper blade configured for seating on the support.

28. The conveyor belt cleaner system of claim 27 further comprising a securing mechanism having an unlocked configuration that permits the cleaner assembly to be positioned on the support with the bottom surface of the scraper blade resilient lower body portion seated on the support and a locked configuration that secures the cleaner assembly to the support with the exposed, downwardly facing bottom surface of the scraper blade lower body portion seated on the support.

29. The conveyor belt cleaner system of claim 27 wherein the elongate mounting member includes opposite end portions that both extend out from the through opening of the at least one scraper blade mounted to the elongate mounting member; and
a pair of clamps configured to fix the elongate mounting member end portions to the support.

30. The conveyor belt cleaner system of claim 27 wherein the support includes a pole with a convex outer surface and the exposed, downwardly facing bottom surface of lower body portion of the at least one scraper blade includes a concave surface portion for engaging the convex outer surface of the pole.

31. The conveyor belt cleaner system of claim 27 wherein the resilient lower body portion includes a base portion extending below the through opening and including the exposed, downwardly facing bottom surface; and
the elongate mounting member and the support are substantially rigid such that the base portion of the resilient lower body portion is held between the substantially rigid elongate mounting member and the substantially rigid support with the securing mechanism securing the cleaner assembly to the support.

32. A conveyor belt cleaner system comprising:
a support for extending across a conveyor belt;
a cleaner assembly for being positioned on the support, the cleaner assembly including an elongate mounting member and at least one scraper blade for being mounted on the elongate mounting member;
an upper scraping portion of the at least one scraper blade;
a resilient, lower body portion of the at least one scraper blade;
a through opening of the resilient lower body portion of the at least one scraper blade for receiving the elongate mounting member extending therethrough to mount the at least one scraper blade to the elongate mounting member; and
a bottom surface of the resilient lower body portion of the at least one scraper blade configured for seating on the support,
wherein the elongate mounting member has a non-linear cross-section and a pair of lower surfaces extending transverse to each other and the support includes at least one seat having a pair of upper seating surfaces extending transverse to each other and configured to form a flush engagement with the elongate mounting member lower surfaces.

33. A conveyor belt cleaner system comprising:
a support for extending across a conveyor belt;
a cleaner assembly for being positioned on the support, the cleaner assembly including an elongate mounting member and at least one scraper blade for being mounted on the elongate mounting member;
an upper scraping portion of the at least one scraper blade;
a resilient, lower body portion of the at least one scraper blade;
a through opening of the resilient lower body portion of the at least one scraper blade for receiving the elongate mounting member extending therethrough to mount the at least one scraper blade to the elongate mounting member;
a bottom surface of the resilient lower body portion of the at least one scraper blade configured for seating on the support; and at least one clamp mechanism having a ring-shaped body with an opening sized to receive the elongate mounting member and the support therethrough to permit the body to be slid onto the elongate mounting member, the at least one clamp mechanism further including a clamp actuator for clamping the elongate mounting member against the support.

34. A method of connecting a cleaner assembly having an elongate mounting member and at least one scraper blade to a support assembly extending across a conveyor belt, the method comprising:
   seating a resilient, lower body portion of the at least one scraper blade of the cleaner assembly on the support assembly; and
   clamping the elongate mounting member to the support assembly with the resilient, lower body portion of the scraper blade seated on the support assembly.

35. The method of claim 34 further comprising advancing an end of the elongate mounting member through a through opening of the at least one scraper blade to mount the at least one scraper blade to the elongate mounting member.

36. The method of claim 34 wherein clamping the elongate mounting member to the support assembly includes shifting a pair of clamps onto the elongate mounting member and clamping the elongate mounting member against the support assembly with the pair of clamps.

37. The method of claim 36 wherein clamping the elongate mounting member against the support assembly includes capturing the resilient lower body portion of the at least one scraper blade between the elongate mounting member and the support assembly.

\* \* \* \* \*